US012702874B2

(12) United States Patent
Stein et al.

(10) Patent No.: US 12,702,874 B2
(45) Date of Patent: Aug. 11, 2026

(54) NEGATIVE PRESSURE REUSABLE RESPIRATOR SYSTEM FOR SAFETY EVENT DETECTION

(71) Applicant: 3M INNOVATIVE PROPERTIES COMPANY, St. Paul, MN (US)

(72) Inventors: David R. Stein, White Bear Lake, MN (US); Caroline M. Ylitalo, Stillwater, MN (US); Craig E. Colton, Stillwater, MN (US); Steven T. Awiszus, Woodbury, MN (US); Shane A. Hainey, Cottage Grove, MN (US); Richard C. Webb, St. Paul, MN (US); Scott A. Larson, Oakdale, MN (US); Andrew W. Long, Woodbury, MN (US); Daniel B. Taylor, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1166 days.

(21) Appl. No.: 17/309,788

(22) PCT Filed: Dec. 19, 2019

(86) PCT No.: PCT/IB2019/061103
§ 371 (c)(1),
(2) Date: Jun. 18, 2021

(87) PCT Pub. No.: WO2020/128952
PCT Pub. Date: Jun. 25, 2020

(65) Prior Publication Data

US 2022/0054869 A1 Feb. 24, 2022

Related U.S. Application Data

(60) Provisional application No. 62/813,724, filed on Mar. 4, 2019, provisional application No. 62/784,012, filed on Dec. 21, 2018.

(51) Int. Cl.
*A62B 18/08* (2006.01)
*A62B 9/00* (2006.01)
(Continued)

(52) U.S. Cl.
CPC ............ *A62B 18/088* (2013.01); *A62B 9/006* (2013.01); *A62B 18/02* (2013.01); *A62B 18/08* (2013.01);
(Continued)

(58) Field of Classification Search
CPC ....... A62B 18/088; A62B 9/006; A62B 18/02; A62B 18/08; A62B 27/00; A62B 18/025; A62B 18/00; G08B 21/182
See application file for complete search history.

(56) References Cited

U.S. PATENT DOCUMENTS 4,846,166 A 7/1989 Willeke
4,875,477 A 10/1989 Waschke
(Continued)

FOREIGN PATENT DOCUMENTS

CN 106767996 A * 5/2017
WO WO 2009-029326 3/2009
(Continued)

OTHER PUBLICATIONS

English Machine translation of CN106767996A via USPTO Fit database on Nov. 13, 2024 (Year: 2017).*
(Continued)

*Primary Examiner* — Justine R Yu
(74) *Attorney, Agent, or Firm* — Katherine M. Scholz

(57) ABSTRACT

A system includes a negative pressure reusable respirator configured to be worn by a worker and to cover at least a mouth and a nose of the worker, a sensor configured to generate sensor data indicative of a characteristic of air within a work environment, and at least one computing
(Continued)

device. The negative pressure reusable respirator includes at least one contaminant capture device configured to remove contaminants from air as the air is drawn through the contaminant capture device when the worker inhales. The at least one contaminant capture device is configured to be removable from the negative pressure reusable respirator. The at least one computing device configured to determine whether the at least one contaminant capture device is due for replacement, and perform one or more actions in response to determining the at least one contaminant capture device is due for replacement.

12 Claims, 4 Drawing Sheets

(51) Int. Cl.
*A62B 18/02* (2006.01)
*A62B 27/00* (2006.01)
*G08B 21/18* (2006.01)

(52) U.S. Cl.
CPC ............ *A62B 27/00* (2013.01); *A62B 18/025* (2013.01); *G08B 21/182* (2013.01)

(56) References Cited

U.S. PATENT DOCUMENTS

| | | | | |
|---|---|---|---|---|
| 6,199,550 | B1 | 3/2001 | Wiesmann | |
| 6,606,993 | B1 | 8/2003 | Wiesmann | |
| 6,934,571 | B2 | 8/2005 | Wiesmann | |
| 7,204,250 | B1 | 4/2007 | Burton | |
| 7,860,662 | B2 | 12/2010 | Parham | |
| 8,281,787 | B2 | 10/2012 | Burton | |
| 8,409,511 | B2 | 4/2013 | Thomas | |
| 8,534,123 | B2 | 9/2013 | Herman | |
| 8,623,117 | B2 | 1/2014 | Zavodny | |
| 9,011,584 | B2 | 4/2015 | Tobias | |
| 9,061,224 | B2 | 6/2015 | Verdegan | |
| 9,262,903 | B2 | 2/2016 | Kamalakannan | |
| 9,295,934 | B2 | 3/2016 | Rakow | |
| 9,504,859 | B2 | 11/2016 | Ding | |
| 10,445,747 | B2 | 10/2019 | Farioli Brioschi | |
| 2011/0270085 | A1 | 11/2011 | King | |
| 2014/0001376 | A1* | 1/2014 | Liu | A62B 18/088 250/461.1 |
| 2014/0005497 | A1 | 1/2014 | Larsen | |
| 2016/0166859 | A1 | 6/2016 | Rachapudi | |
| 2017/0246486 | A1 | 8/2017 | Cazier | |
| 2017/0296094 | A1 | 10/2017 | Fonzi | |
| 2017/0372216 | A1 | 12/2017 | Awiszus | |
| 2017/0374436 | A1 | 12/2017 | Awiszus | |
| 2018/0008849 | A1 | 1/2018 | Baker | |
| 2018/0108236 | A1 | 4/2018 | Kanukurthy et al. | |
| 2018/0140989 | A1 | 5/2018 | Arthur | |
| 2018/0311517 | A1* | 11/2018 | Patil | A62B 18/02 |
| 2018/0353783 | A1* | 12/2018 | Dwyer | A62B 27/00 |
| 2019/0064750 | A1 | 2/2019 | Awiszus et al. | |

FOREIGN PATENT DOCUMENTS

| | | | | |
|---|---|---|---|---|
| WO | 2014120502 | A2 | 8/2014 | |
| WO | WO-2017040397 | A1 * | 3/2017 | A41D 13/0002 |
| WO | WO 2017-069756 | | 4/2017 | |
| WO | WO 2017-120452 | | 7/2017 | |
| WO | WO 2017-223438 | | 12/2017 | |
| WO | WO 2018-058421 | | 4/2018 | |
| WO | WO-2018106258 | A1 * | 6/2018 | |
| WO | WO 2019-043578 | | 3/2019 | |
| WO | WO 2019-157007 | | 8/2019 | |
| WO | WO 2019/160535 | | 8/2019 | |
| WO | WO 2019-224659 | | 11/2019 | |

OTHER PUBLICATIONS

International Search Report for PCT International Application No. PCT/IB2019/061103, mailed on Jun. 29, 2020, 6 pages.

* cited by examiner

NEGATIVE PRESSURE REUSABLE RESPIRATOR SYSTEM FOR SAFETY EVENT DETECTION

CROSS REFERENCE TO RELATED APPLICATIONS

This application is a national stage filing under 35 U.S.C. 371 of PCT/IB2019/061103, filed Dec. 19, 2019, which claims the benefit of U.S. Provisional Application No. 62/813,724, filed Mar. 4, 2019, and U.S. Provisional Application No. 62/784,012, filed Dec. 21, 2018, the disclosure of which is incorporated by reference in its/their entirety herein.

TECHNICAL FIELD

The present disclosure relates to personal protective equipment.

BACKGROUND

Many work environments include hazards that may expose people working within a given environment to a safety event, such as a fall, breathing contaminated air, or temperature related injuries (e.g., heat stroke, frostbite, etc.). In many work environments, workers may utilize personal protective equipment (PPE) to help mitigate the risk of a safety event. Often, a worker may not recognize an impending safety event until the environment becomes too dangerous or the worker's health deteriorates too far.

SUMMARY

In general, the present disclosure describes enhanced negative pressure re-usable respirators and an analytics and safety event detection engine and alerting system for negative pressure re-usable respirators. According to examples of this disclosure, the negative pressure re-usable respirator includes one or more sensors to detect operating parameters of the negative pressure re-usable respirator. In one example, the negative pressure respirator includes an air pressure sensor to detect air pressure within a space sealed by the negative pressure re-usable respirator (e.g., the pressure of the air between the worker's face and the respirator) as the worker breathes. In another example, the negative pressure re-usable respirator includes a sensor to detect a distance between the worker's face and the respirator. In some examples, the negative pressure re-usable respirator and/or a work environment includes environmental sensors to detect a quality of the air in the work environment, such as a gas or vapor sensor configured to detect the concentration of a hazardous gas or vapor in the work environment. The negative pressure re-usable respirators are configured to physically couple to one or more contaminant capture devices (e.g., particulate filters and/or chemical cartridges) that are configured to remove contaminants from air breathed by a worker.

In some examples, a computing system detects safety events, such as saturation or loading of a contaminant capture device or exhaustion of a contaminant capture device. In one example, the computing system detects loading of a particulate filter based on the air pressure within a cavity or sealable space between a facepiece of the negative pressure re-usable respirator and the worker's face. In another example, the computing system detects exhaustion of a chemical cartridge based on sensor data indicative of a gas or vapor chemical concentration within the work environment. In this way, techniques of this disclosure may enable the computing system to detect safety events more accurately or more timely and notify (e.g., in real-time) workers when a contaminant capture device is due for replacement. Replacing the contaminant capture device in a more timely manner may increase worker safety, for example, by preventing gases from breaking through a chemical cartridge and/or improving the ability of the worker to breathe when using a particulate filter while still protecting the worker from particulates.

The computing system, in some examples, determines whether the negative pressure re-usable respirator provides a seal around the worker's face. In one example, the negative pressure re-usable respirator includes an infrared sensor that generates data indicative of a distance between the respirator and the worker's face. In such examples, the computing system may determine whether air within the cavity defined by the facepiece of the respirator and the workers face is sealed from air external to the respirator based on the distance.

In some examples, the contaminant capture devices include a communication unit (e.g., a Radio Frequency Identification (RFID) tag) that is configured to transmit information indicative of the contaminant capture device to a computing system. For example, an RFID tag may output identification information (e.g., a unique identifier, a type of contaminant capture device, etc.) for the contaminant capture device. In some examples, the computing system determines a type of contaminant the contaminant capture device is configured to capture based on the identification information and compares to the types of contaminants within the work environment.

In one example, the disclosure describes a system that includes a negative pressure reusable respirator configured to be worn by a worker and to cover at least a mouth and a nose of the worker, a sensor configured to generate sensor data indicative of a characteristic of air within a work environment, and at least one computing device. The negative pressure reusable respirator includes at least one contaminant capture device configured to remove contaminants from air as the air is drawn through the contaminant capture device when the worker inhales. The at least one contaminant capture device is configured to be removable from the negative pressure reusable respirator. The at least one computing device is configured to determine, based at least in part on the sensor data, whether the at least one contaminant capture device is due for replacement; and perform one or more actions in response to determining the at least one contaminant capture device is due for replacement.

In another example, the disclosure describes a negative pressure reusable respirator configured to be worn by a worker and to cover at least a mouth and a nose of the worker. The negative pressure reusable respirator includes at least one contaminant capture device configured to remove contaminants from air as the air is drawn through the contaminant capture device when the worker inhales. The at least one contaminant capture device is configured to be removable from the negative pressure reusable respirator. The negative pressure reusable respirator includes a sensor configured to generate sensor data indicative of a characteristic of air within a work environment. The negative pressure reusable respirator also includes at least one computing device configured to determine, based at least in part on the sensor data, whether the at least one contaminant capture device is due for replacement; and perform one or more actions in response to determining the at least one contaminant capture device is due for replacement.

In another example, the disclosure describes a computing device that includes memory and at least one processor. The memory includes instructions that, when executed, cause the at least one processor to receive sensor data indicative of a characteristic of air within a work environment. Execution of the instructions further cause the at least one processor to determine, based at least in part on the sensor data, whether at least one contaminant capture device coupled to a negative pressure reusable respirator is due for replacement, wherein the at least one contaminant capture device is configured to remove contaminants from air as the air is drawn through the contaminant capture device when a worker inhales, and wherein the at least one contaminant capture device is configured to be removable from the negative pressure reusable respirator. Execution of the instructions further cause the at least one processor to perform one or more actions in response to determining the at least one contaminant capture device is due for replacement.

The details of one or more examples of the disclosure are set forth in the accompanying drawings and the description below. Other features, objects, and advantages of the disclosure will be apparent from the description and drawings, and from the claims.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
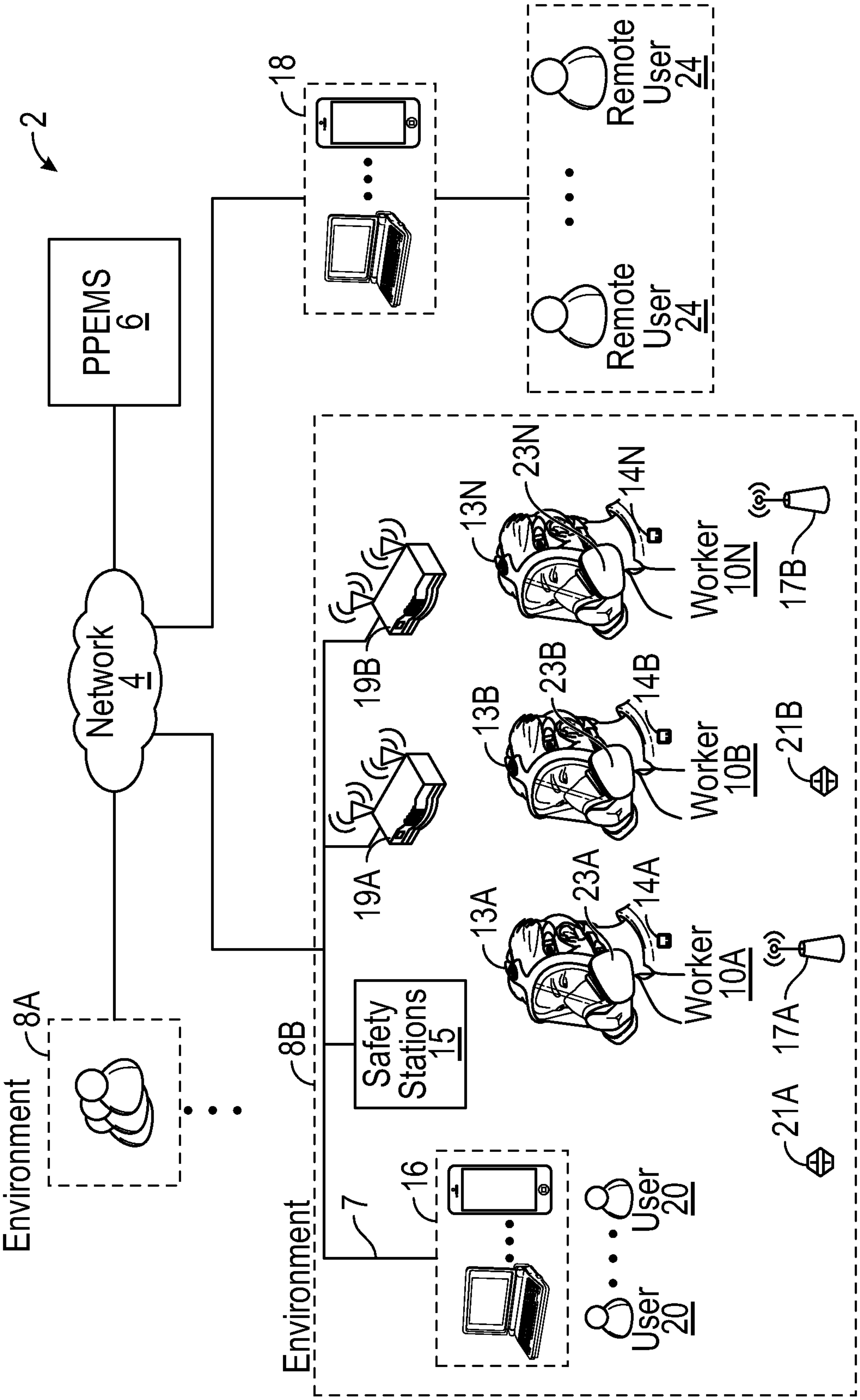
FIG. 1 is a block diagram illustrating an example system that includes a negative pressure re-usable respirator and a personal protection equipment management system, in accordance with various techniques of this disclosure.

FIG. 1 is a block diagram illustrating an example system 2 that a personal protective equipment management system (PPEMS) 6 for providing analytics and alerting of safety events for a plurality of negative pressure re-usable respirators 13A-13N, according to techniques described in this disclosure. For example, each of negative pressure re-usable respirators 13A-13N (collectively, negative pressure re-usable respirators 13) include one or more sensors to detect conditions of the respective negative pressure re-usable respirators 13, and one or more computing devices (e.g., PPEMS 6, hubs 14, among others) utilize the sensor data from the sensors of the negative pressure re-usable respirators 13 to detect or predict safety events associated with negative pressure re-usable respirators 13. As used in this disclosure, safety events may refer to saturation or loading of a contaminant capture device of a negative pressure re-usable respirator (e.g., blockage of a particulate filter), exhaustion of a contaminant capture device (e.g., break though of a chemical cartridge), incompatibility between the hazards a contaminant capture device is configured to protect against and hazards within a work environment, insufficient seal between the respirator and the worker's face, among others.

According to techniques of this disclosure, the one or more computing devices, such as PPEMS 6, monitor usage to detect and/or predict safety events and alert workers of such safety events. In some examples, PPEMS 6 monitor usage of contaminant capture devices 23A-23N of negative pressure re-usable respirators 13 and determine whether the contaminant capture device (e.g., a particulate filter) is due for replacement. As another example, PPEMS 6 may determine whether the air within a sealable space defined by (e.g., formed between) a worker's face and a respective negative pressure re-usable respirator 13 is sealed from air within the work environment (e.g., air exterior to the respirator). In some instances, PPEMS 6 determines whether the contaminant capture device utilized by a particular worker is configured to protect the worker from hazards within the work environment.

As shown in the example of FIG. 1, system 2 represents a computing environment in which computing device(s) within a plurality of physical environments 8A, 8B (collectively, environments 8) electronically communicate with PPEMS 6 via one or more computer networks 4. Each of physical environment 8 represents a physical environment, such as a work environment, in which one or more individuals, such as workers 10, utilize personal protective equipment 13 while engaging in tasks or activities within the respective environment. Example environments 8 include construction sites, mining sites, manufacturing sites, among others.

In this example, environment 8A is shown as generally as having workers 10, while environment 8B is shown in expanded form to provide a more detailed example. In the example of FIG. 1, a plurality of workers 10A-10N are shown as utilizing personal protective equipment (PPE), such as negative pressure re-usable respirators 13. As used throughout this disclosure, negative pressure re-usable respirators 13 include any re-usable respirator in which the air pressure inside the facepiece is less than the ambient air pressure (e.g., the pressure of the air outside the respirator) during inhalation. Although respirators 13 in the example of FIG. 1 are illustrated as negative-pressure re-usable respirators, the techniques described herein apply to other types of respirators, such as positive pressure re-usable respirators, disposable respirators, or powered-air purifying respirators. As used throughout this disclosure, a positive pressure respirator includes any respirator in which the air pressure inside the facepiece is greater than the ambient air pressure. Negative pressure re-usable respirators 13 include a facepiece (e.g., a full facepiece, or a half facepiece) configured to cover at least a worker's nose and mouth. For example, a half facepiece may cover a worker's nose and mouth and a full facepiece may cover a worker's eyes, nose, and mouth. Negative pressure re-usable respirators 13 may fully or partially (e.g., 75%) cover a worker's head. Negative pressure re-usable respirators 13 may include a head harness (e.g., an elastic strap) that secures negative pressure re-usable respirators 13 to the back of the worker's head.

In some examples, negative pressure re-usable respirators 13 are configured to receive contaminant capture devices 23A-23N (collectively, contaminant capture devices 23). Contaminant capture devices 23 are configured to remove contaminants from air as air is drawn through the contaminant capture device (e.g., when a worker wearing a reusable respirator inhales). Contaminant capture devices 23 include particulate filters, chemical cartridges, or combination particulate filters/chemical cartridges. As used throughout this disclosure, particulate filters are configured to protect a worker from particulates (e.g., dust, mists, fumes, smoke, mold, bacteria, etc.). Particulate filters capture particulates through impaction, interception, and/or diffusion. As used throughout this disclosure, chemical cartridges are configured to protect a worker from gases or vapors. Chemical cartridges may include sorbent materials (e.g., activated carbon) that react with a gas or vapor to capture the gas or vapor and remove the gas or vapor from air breathed by a worker. For instance, chemical cartridges may capture organic vapors, acid gasses, ammonia, methylamine, formaldehyde, mercury vapor, chlorine gas, among others.

Contaminant capture devices 23 are removable. In other words, a worker may remove a contaminant capture device from a negative pressure re-usable respirator 13 (e.g., upon the contaminant capture device reaching the end of its expected lifespan) and install a different (e.g., unused, new) contaminant capture device to the respirator. In some examples, the particulate filters or chemical cartridges have a limited service life. In some examples, when a chemical cartridge is exhausted (e.g., captures a threshold amount of gas or vapors), gases or vapors may pass through the chemical cartridge to the worker (which is called "breakthrough"). In some examples, as particulate filters become saturated with a contaminant, the filter becomes harder to pull air through, thus making the worker inhale deeper to breathe.

Each of negative pressure re-usable respirators 13 include, in some examples, embedded sensors or monitoring devices and processing electronics configured to capture data in real-time as a user (e.g., worker) engages in activities while utilizing (e.g., wearing) the respirator. Negative pressure re-usable respirators 13 include a number of sensors for sensing operational characteristics of the respirators 13. For example, respirators 13 include an air pressure sensor configured to detect the air pressure in the cavity formed between the respirator and the worker's face, which detect the air pressure within the cavity as the worker 10 breathes (e.g., inhales and exhales). In other words, the air pressure sensors detect the air pressure within the sealed space (also referred to as a cavity, or respirator cavity) formed by a face of the worker and the negative pressure reusable respirator. In addition, each of negative pressure re-usable respirators 13 may include one or more output devices for outputting data that is indicative of operation of negative pressure re-usable respirator 13 and/or generating and outputting communications to the respective worker 10. For example, negative pressure re-usable respirators 13 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

Each of negative pressure re-usable respirators 13 is configured to communicate data, such as sensed motions, events and conditions, via wireless communications, such as via 802.11 WiFi® protocols, Bluetooth® protocol or the like. Negative pressure re-usable respirators 13 may, for example, communicate directly with a wireless access point 19. As another example, each worker 10 may be equipped with a respective one of wearable communication hubs 14A-14M that enable and facilitate communication between negative pressure re-usable respirators 13 and PPEMS 6. For example, negative pressure re-usable respirators 13 as well as other PPEs (such as fall protection equipment, hearing protection, hardhats, or other equipment) for the respective worker 10 may communicate with a respective communication hub 14 via Bluetooth or other short-range protocol, and the communication hubs may communicate with PPEMs 6 via wireless communications processed by wireless access points 19. Although shown as wearable devices, hubs 14 may be implemented as stand-alone devices deployed within environment 8B. In some examples, hubs 14 may be articles of PPE.

In general, each of environments 8 include computing facilities (e.g., a local area network) by which sensing stations 21, beacons 17, and/or negative pressure re-usable respirators 13 are able to communicate with PPEMS 6. For examples, environments 8 may be configured with wireless technology, such as 802.11 wireless networks, 802.15 ZigBee networks, and the like. In the example of FIG. 1, environment 8B includes a local network 7 that provides a packet-based transport medium for communicating with PPEMS 6 via network 4. Environment 8B may include wireless access point 19 to provide support for wireless communications. In some examples, environment 8B may include a plurality of wireless access points 19 that may be geographically distributed throughout the environment to provide support for wireless communications throughout the work environment.

In some examples, each worker 10 may be equipped with a respective one of wearable communication hubs 14A-14N that enable and facilitate wireless communication between PPEMS 6 and sensing stations 21, beacons 17, and/or negative pressure re-usable respirators 13. For example, sensing stations 21, beacons 17, and/or negative pressure re-usable respirators 13 may communicate with a respective communication hub 14 via wireless communication (e.g., Bluetooth® or other short-range protocol), and the communication hubs may communicate with PPEMS 6 via wireless communications processed by wireless access point 19. Although shown as wearable devices, hubs 14 may be implemented as stand-alone devices deployed within environment 8B.

In general, each of hubs 14 is programmable via PPEMS 6 so that local alert rules may be installed and executed without requiring a connection to the cloud. As such, each of hubs 14 provides a relay of streams of data from sensing stations 21, beacons 17, and/or negative pressure re-usable respirators 13, and provides a local computing environment for localized alerting based on streams of events in the event communication with PPEMS 6 is lost.

As shown in the example of FIG. 1, an environment, such as environment 8B, may also contain one or more wireless-enabled beacons, such as beacons 17A-17B, that provide accurate location data within the work environment. For example, beacons 17A-17B may be GPS-enabled such that a controller within the respective beacon may be able to precisely determine the position of the respective beacon. Based on wireless communications with one or more of beacons 17, a given negative pressure re-usable respirator 13 or communication hub 14 worn by a worker 10 is configured to determine the location of the worker within environment 8B. In this way, event data reported to PPEMS 6 may be stamped with positional data to aid analysis, reporting and analytics performed by PPEMS 6.

In addition, an environment, such as environment 8B, may also include one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional data when reporting environmental data to PPEMS 6. As such, PPEMS 6 may be configured to correlate the sensed environmental conditions with the particular regions and, therefore, may utilize the captured environmental data when processing event data received from negative pressure re-usable respirators 13, or sensing stations 21. For example, PPEMS 6 may utilize the environmental data to aid generating alerts or other instructions for negative pressure re-usable respirators 13 and for performing predictive analytics, such as determining any correlations between certain environmental conditions (e.g., heat, humidity, visibility) with abnormal worker behavior or increased safety events. As such, PPEMS 6 may utilize current environmental conditions to aid prediction and avoidance of imminent safety events. Example environmental conditions that may be sensed by sensing stations 21 include but are not limited to temperature, humidity, presence of gas, pressure, visibility, wind and the like. Safety events may refer to heat related illness or injury, cardiac related illness or injury, respiratory related illness or injury, or eye or hearing related injury or illness.

In example implementations, an environment, such as environment 8B, may also include one or more safety stations 15 distributed throughout the environment. Safety stations 15 may allow one of workers 10 to check out negative pressure re-usable respirators 13 and/or other safety equipment, verify that safety equipment is appropriate for a particular one of environments 8, and/or exchange data. Safety stations 15 may enable workers 10 to send and receive data from sensing stations 21, and/or beacons 17. For example, safety stations 15 may transmit alert rules, software updates, or firmware updates to negative pressure re-usable respirators 13 or other equipment, such as sensing stations 21, and/or beacons 17. Safety stations 15 may also receive data cached on negative pressure re-usable respirators 13, hubs 14, sensing stations 21, beacons 17, and/or other safety equipment. That is, while equipment such as sensing stations 21, beacons 17, negative pressure re-usable respirators 13, and/or data hubs 14 may typically transmit data via network 4 in real time or near real time, such equipment may not have connectivity to network 4 in some instances, situations, or conditions. In such cases, sensing stations 21, beacons 17, negative pressure re-usable respirators 13, and/or data hubs 14 may store data locally and transmit the data to safety stations 15 upon regaining connectivity to network 4. Safety stations 15 may then obtain the data from sensing stations 21, beacons 17, negative pressure re-usable respirators 13, and/or data hubs 14.

In addition, each of environments 8 may include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Each of environments 8 may include systems. Similarly, remote users may use computing devices 18 to interact with PPEMS 6 via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safely equipment utilized by workers 10, such as accessing and viewing usage records, analytics and reporting. For example, users 20, 24 may review data acquired and stored by PPEMS 6, where the data may include data specifying starting and ending times over a time duration (e.g., a day, a week, etc.), data collected during particular events, such as pulling a respirator away from the worker's face (e.g., such that the cavity formed by the worker's face and the respirator is not sealed, which may expose the worker to breathing hazards, without necessarily removing the respirator from the worker 10), removal of a negative pressure re-usable respirator 13 from a worker 10, changes to operating parameters of a negative pressure re-usable respirator 13, status changes to components of negative pressure re-usable respirators 13 (e.g., a low battery event), motion of workers 10, detected impacts to negative pressure re-usable respirators 13 or hubs 14, sensed data acquired from the user, environment data, and the like. In addition, users 20, 24 may interact with PPEMS 6 to perform asset tracking and to schedule maintenance events for individual pieces of safety equipment, e.g., negative pressure re-usable respirators 13, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

PPEMS 6 provides an integrated suite of personal safety protection equipment management tools and implements various techniques of this disclosure. That is, PPEMS 6 provides an integrated, end-to-end system for managing personal protection equipment, e.g., respirators, used by workers 10 within one or more physical environments 8. The techniques of this disclosure may be realized within various parts of system 2.

PPEMS 6 may integrate an event processing platform configured to process thousand or even millions of concurrent streams of events from digitally enabled devices, such as sensing stations 21, beacons 17, negative pressure re-usable respirators 13, and/or data hubs 14. An underlying analytics engine of PPEMS 6 may apply models to the inbound streams to compute assertions, such as identified anomalies or predicted occurrences of safety events based on conditions or behavior patterns of workers 10.

Further, PPEMS 6 may provide real-time alerting and reporting to notify workers 10 and/or users 20, 24 of any predicted events, anomalies, trends, and the like. The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 tightly integrates comprehensive tools for managing personal protective equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS 6 to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, PPEMS 6 may provide a database query engine for directly querying PPEMS 6 to view acquired safety data, compliance data and any results of the analytic engine, e.g., by the way of dashboards, alert notifications, reports and the like. That is, users 20, 24 or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 8 for which unusually anomalous (e.g., high) safety events have been or are predicted to occur, identifications of any of environments 8 exhibiting anomalous occurrences of safety events relative to other environments, and the like.

As illustrated in detail below, PPEMS 6 may simplify workflows for individuals charged with monitoring and ensure safety compliance for an entity or environment. That is, PPEMS 6 may enable active safety management and allow an organization to take preventative or correction actions with respect to certain regions within environments 8, particular pieces of safety equipment or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of negative pressure re-usable respirators 13. In this manner, PPEMS 6 may identify individual negative pressure re-usable respirators 13 or workers 10 for which the metrics do not meet the benchmarks and prompt the users to intervene and/or perform procedures to improve the metrics relative to the benchmarks, thereby ensuring compliance and actively managing safety for workers 10.

In accordance with techniques of this disclosure, PPEMS 6 determines whether a contaminant capture device 23 of a negative pressure re-usable respirator 13 is due for replacement. In some examples, PPEMS 6 determines whether a contaminant capture device (e.g., contaminant capture device 23A) is due to be replaced based at least in part on sensor data generated by one or more sensors in environment 8B, such as sensing stations 21, sensors of negative pressure re-usable respirators 13, or a combination therein.

In some examples, contaminant capture device 23A includes a particulate filter and negative pressure re-usable respirator 13A includes a pressure sensor configured to detect the air pressure of air within a cavity formed and sealed by the face of worker 10A and negative pressure re-usable respirator 13A. In such examples, PPEMS 6 determines whether contaminant capture device 23A should be replaced based on the air pressure within the cavity sealed by the face of worker 10A and negative pressure re-usable respirator 13A. For example, the air pressure sensor detects a decrease in the air pressure within the cavity as worker 10A inhales. PPEMS 6 may determine a pressure differential as worker 10A inhales over time. In other words, PPEMS 6 may determine a baseline pressure within the sealed cavity when the worker inhales at a first time (e.g., when the filter is new), a current pressure within the sealed cavity when the worker inhales at a second, later time, and determine the pressure differential as a difference between the baseline pressure and the current pressure.

PPEMS 6 may compare the pressure differential to a threshold decrease in air pressure (also referred to as a threshold pressure differential). In some examples, PPEMS 6 may determine that contaminant capture device 23A is due for replacement in response to determining that the pressure differential satisfies (e.g., is greater than or equal to) a threshold pressure differential. PPEMS 6 may determine that contaminant capture device 23A is not due for replacement in response to determining that the pressure differential does not satisfy a threshold pressure differential.

In some examples, contaminant capture device 23A includes a chemical cartridge and environment 8B includes a sensing station 21A configured to detect the concentration of one or more contaminants (e.g., gases or vapors) in work environment 8B. In such examples, PPEMS 6 may determine whether contaminant capture device 23A should be replaced based at least in part on the concentration of the contaminant and an amount of time worker 10A is located with environment 8B. For example, PPEMS 6 may determine a threshold protection time (e.g., an amount of time that contaminant capture device 23A protects worker 10A) based on device data for the contaminant capture device 23A and the contamination concentration. The device data may indicate a type of contaminant capture device 23A, an amount of contaminants the contaminant capture device 23A can capture (also referred to as a contaminant capture capacity), among others. For instance, PPEMS 6 may determine the threshold protection time based on the contaminant capture capacity of contaminant capture device 23A and the contaminant concentration within work environment 8B. In such instances, PPEMS 6 determines whether the actual usage time (e.g., time within environment 8B) of contaminant capture device 23A satisfies the threshold protection time. In some examples, PPEMS 6 determines that contaminant capture device 23A is not due for replacement in response to determining that the actual usage time of contaminant capture device 23A does not satisfy (e.g., is less than) the threshold protection time. As another example, PPEMS 6 determines that contaminant capture device 23A is due for replacement in response to determining that the actual usage time of contaminant capture device 23A satisfies (e.g., is greater than or equal to) the threshold protection time.

Responsive to determining that contaminant capture device 23A is due for replacement, PPEMS 6 performs one or more actions. In one example, PPEMS 6 outputs a notification to computing device associated with worker 10A (e.g., hub 14A), computing devices 16, 18 associated with users 20, 24, to safety stations 15, or other computing devices. In some examples, the notification includes data indicating the negative pressure re-usable respirator 13A or component of the negative pressure re-usable respirator 13A that is due for replacement, the worker associated with the respirator, a location of the worker, among other data. In some instances, a computing device (e.g., hub 14A) receives the notification and output an alert, for instance, by outputting an audible, visual, or tactile alert.

In some examples, PPEMS 6 determines whether the negative pressure re-usable respirator provides a seal around the worker's face. PPEMS 6 may determine whether the negative pressure re-usable respirator 13A provides a seal based on sensor data from an infrared sensor of negative pressure re-usable respirator 13A. For instance, the infrared sensor may generate data indicative of a distance between a negative pressure re-usable respirator 13A (e.g., a face piece of negative pressure re-usable respirator 13A) and the face of worker 10A. In some examples, PPEMS 6 determines whether negative pressure re-usable respirator 13A seals a cavity between the worker's face and the respirator based on the distance between the negative pressure re-usable respirator and the face of the worker. For example, PPEMS 6 may compare the distance to a threshold distance. In some instances, PPEMS 6 determines that negative pressure re-usable respirator 13A does not provide a seal in response to determining that the distance satisfies (e.g., is greater than) a threshold distance. For instance, PPEMS 6 may determine that worker 10A is not clean shaven or pulled respirator 13A away from his or her face in response to determining that the distance satisfies (e.g., is greater than) a threshold distance. In such instances, PPEMS 6 may output a notification to another computing device (e.g., computing devices 18) indicating worker 10A is not clean shaven or pulled respirator 13A away from his or her face. In some instances, PPEMS 6 causes a computing device associated with worker 10A (e.g., hub 14A) to output an alert (e.g., visual, audible, haptic) indicating negative pressure re-usable respirator 13A does not provide a seal around the worker's face. In some examples, the alert indicates worker 10A is not clean shaven or pulled respirator 13A away from his or her face. In this way, PPEMS 6 may provide real-time (or near real-time) monitoring of the negative pressure re-usable respirator, which may increase worker safety by alerting workers 10 when the respective negative pressure re-usable respirators 13 do not form a seal with the face of the respective workers 10 and thus potentially expose the respective worker 10 to hazards within the air present in the work environment (e.g., within air exterior to the respirator).

In some examples, each contaminant capture device 23 includes a communication unit that is configured to transmit information indicative of the respective contaminant capture device 23 to a computing system. For example, the communication device may include an RFID tag configured to output identification information (e.g., a unique identifier, a type of contaminant capture device, etc.) for the respective contaminant capture device 23. In some instances, PPEMS 6 determines whether contaminant capture device 23A is configured to protect worker 10A from hazards within the work environment 8B based on the identification information. For instance, PPEMS 6 may determine the types of contaminants that contaminant capture device 23A is configured to protect against based on a type of the contaminant capture device 23A and compare such types of contaminants to types of contaminants within the work environment 8B. In some examples, the PPEMS 6 alerts worker 10A when the contaminant capture device 23A is not configured to protect workers from contaminants within the work environment 8B, which may enable a worker to utilize the correct contaminant capture device for the hazards within the environment, thereby potentially increasing worker safety.

While described with reference to PPEMS 6, the functionality described in this disclosure may be performed by other computing devices, such as one or more hubs 14 or computing devices of one or more negative pressure re-usable respirators 13. For example, one or more hubs 14 may determine whether a contaminant capture device 23 of a negative pressure re-usable respirator 13 is due for replacement. As another example, hub 14A may determine whether negative pressure re-usable respirator 13A provides a seal between the face of worker 10A and negative pressure re-usable respirator 13A. In yet another example, hub 14A determines whether contaminant capture device 23A is configured to protect worker 10A from contaminants within the work environment 8B. In some examples, multiple computing devices (e.g., hubs 14 and negative pressure re-usable respirator 13) may collectively perform the functionality described in this disclosure. For example, PPEMS 6 may determine a threshold protection time associated with a contaminant capture device (e.g., a chemical cartridge) and one or more hubs 14 may determine whether the actual usage time for the contaminant capture device satisfies the threshold protection time.

In this way, techniques of this disclosure may enable a computing system to more accurately or timely determine whether a contaminant capture device 23 is due for replacement. The computing system may notify (e.g., in real-time) workers when a contaminant capture device is due for replacement, which may enable a worker to replace the contaminant capture device. Replacing the contaminant capture device in a more timely manner may increase worker safety. For example, replacing a contaminant capture device (e.g., a particulate filter and/or chemical cartridge) of a respirator in a more timely manner may protect the worker by preventing gases from breaking through a chemical cartridge and/or improving the ability of the worker to breathe when using a particulate filter while still protecting the worker from particulates.

Figure 2:
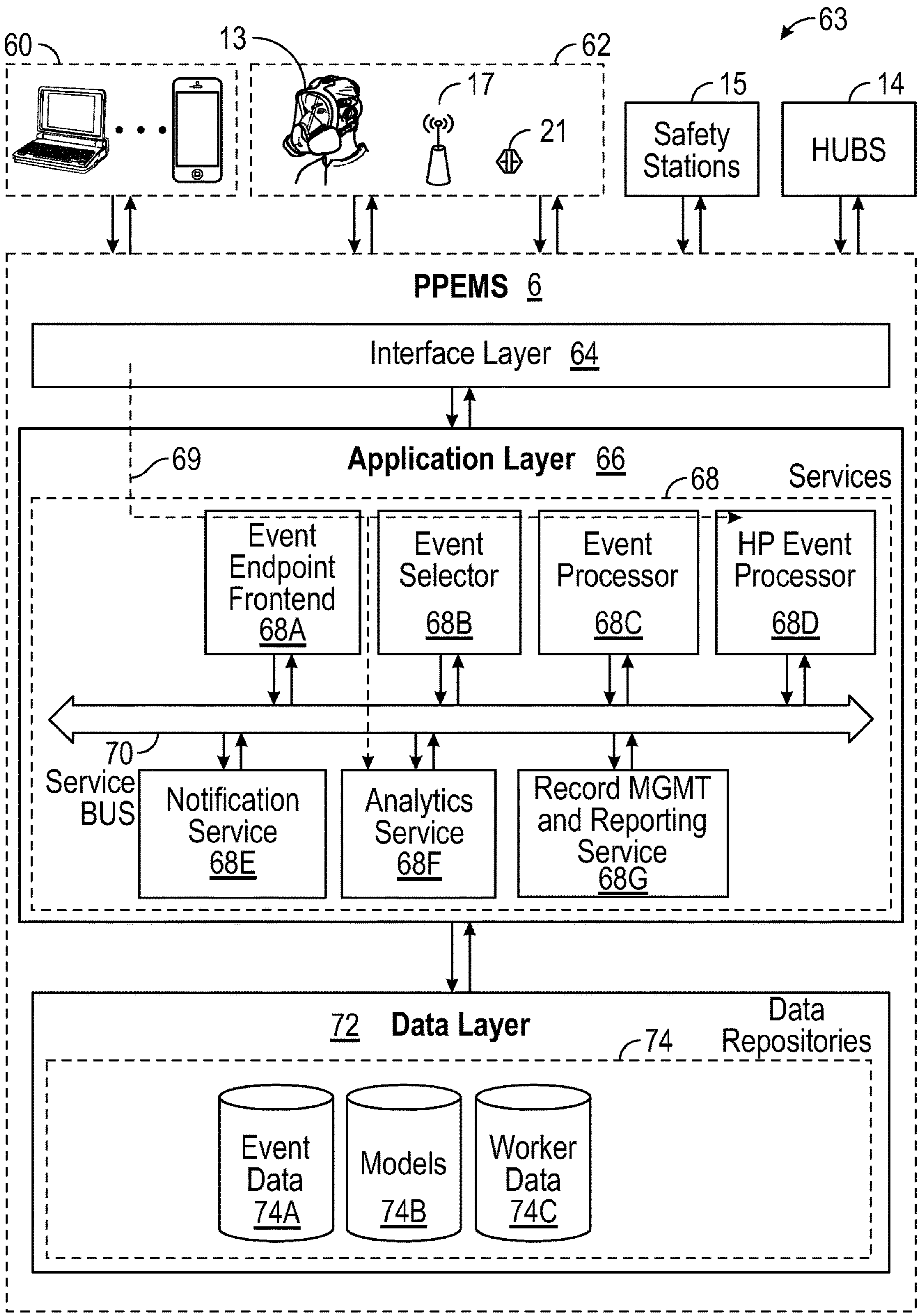
FIG. 2 is a block diagram illustrating, in detail, an operating perspective of the personal protection equipment management system shown in FIG. 1.

FIG. 2 is a block diagram providing an operating perspective of PPEMS 6 when hosted as cloud-based platform capable of supporting multiple, distinct environments 8 having an overall population of workers 10, in accordance with techniques described herein. In the example of FIG. 2, the components of PPEMS 6 are arranged according to multiple logical layers that implement the techniques of the disclosure. Each layer may be implemented by one or more modules comprised of hardware, software, or a combination of hardware and software.

In FIG. 2, safety equipment 62 include personal protective equipment (PPEs) 13, beacons 17, and sensing stations 21. Safety equipment 62, HUBs 14, safety stations 15, as well as computing devices 60, operate as clients 63 that communicate with PPEMS 6 via interface layer 64. Computing devices 60 typically execute client software applications, such as desktop applications, mobile applications, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

Client applications executing on computing devices 60 may communicate with PPEMS 6 to send and receive data that is retrieved, stored, generated, and/or otherwise processed by services 68. For instance, the client applications may request and edit safety event data including analytical data stored at and/or managed by PPEMS 6. In some examples, client applications may request and display aggregate safety event data that summarizes or otherwise aggregates numerous individual instances of safety events and corresponding data obtained from safety equipment 62 and/or generated by PPEMS 6. The client applications may interact with PPEMS 6 to query for analytics data about past and predicted safety events, behavior trends of workers 10, to name only a few examples. In some examples, the client applications may output for display data received from PPEMS 6 to visualize such data for users of clients 63. As further illustrated and described in below, PPEMS 6 may provide data to the client applications, which the client applications output for display in user interfaces.

Client applications executing on computing devices 60 may be implemented for different platforms but include similar or the same functionality. For instance, a client application may be a desktop application compiled to run on a desktop operating system or a mobile application compiled to run on a mobile operating system. As another example, a client application may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward data from the requests to services 68, and provide one or more responses, based on data received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the data to application layer 66, which includes services 68.

As shown in FIG. 2, PPEMS 6 also includes an application layer 66 that represents a collection of services for implementing much of the underlying operations of PPEMS 6. Application layer 66 receives data included in requests received from client applications 61 and further processes the data according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate data to one another. As another example, services 68 may communicate in point-to-point fashion using sockets or other communication mechanisms. Before describing the functionality of each of services 68, the layers are briefly described herein.

Data layer 72 of PPEMS 6 represents a data repository that provides persistence for data in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage data in data repositories 74. The RDBMS software may manage one or more data repositories 74, which may be accessed using Structured Query Language (SQL). Data in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 2, each of services 68A-68G (collectively, services 68) is implemented in a modular form within PPEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors. In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including an event endpoint frontend 68A, event selector 68B, event processor 68C, high priority (HP) event processor 68D, notification service 68E, and analytics service 68F.

Event endpoint frontend 68A operates as a frontend interface for exchanging communications with hubs 14, safety stations 15, and safety equipment 62. In other words, event endpoint frontend 68A operates to as a frontline interface to safety equipment deployed within environments 8 and utilized by workers 10. In some instances, event endpoint frontend 68A may be implemented as a plurality of tasks or jobs spawned to receive individual inbound communications of event streams 69 that include data sensed and captured by the safety equipment 62. For instance, event streams 69 may include sensor data, such as PPE sensor data from one or more negative pressure re-usable respirators 13 and environmental data from one or more sensing stations 21. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and safety equipment 62 and/or hubs 14 may be real-time or pseudo real-time depending on communication delays and continuity.

Event selector 68B operates on the stream of events 69 received from safety equipment 62 and/or hubs 14 via frontend 68A and determines, based on rules or classifications, priorities associated with the incoming events. For example, safety rules may indicate that incidents of incorrect equipment for a given environment, incorrect usage of PPEs, or lack of sensor data associated with a worker's vital signs are to be treated as high priority events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, lack of vital signs, and the like. Responsive to processing high priority events, HP event processor 68D may immediately invoke notification service 68E to generate alerts, instructions, warnings or other similar messages to be output to safety equipment 62, hubs 14, or devices used by users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of data generated by safety equipment 62. For example, in some instances, event data 74A may include entire streams of data obtained from negative pressure re-usable respirator 13, sensing stations 21, etc. In other instances, event data 74A may include a subset of such data, e.g., associated with a particular time period.

Event processors 68C, 68D may create, read, update, and delete event data stored in event data 74A. Event data for may be stored in a respective database record as a structure that includes name/value pairs of data, such as data tables specified in row/column format. For instance, a name (e.g., column) may be "workerID" and a value may be an employee identification number. An event record may include data such as, but not limited to: worker identification, acquisition timestamp(s) and sensor data. For example, event stream 69 for one or more sensors associated with a given worker (e.g., worker 10A) may be formatted as follows:

{"eventTime":"2015-12-31T18:20:53.1210933Z",
"workerID":"00123",
"RespiratorType":"Model 600",
"ContaminantCaptureDeviceType":"P90X",
"AirPressurePSI": 14.0}.

In some examples, event stream 69 include category identifiers (e.g., "eventTime", "workerID", "RespiratorType", "ContaminantCaptureDeviceType", and "AirPressurePSI"), as well as corresponding values for each category.

In some examples, analytics service 68F is configured to perform in depth processing of the incoming stream of events to perform real-time analytics. In this way, stream analytic service 68F may be configured to detect anomalies, transform incoming event data values, trigger alerts upon detecting safety concerns based on conditions or worker behaviors. In addition, stream analytic service 68F may generate output for communicating to safety equipment 62, safety stations 15, hubs 14, or computing devices 60.

Record management and reporting service (RMRS) 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, individual or groups (e.g., types) of safety equipment 62. In response, record management and reporting service 68G accesses event information based on the request. Upon retrieving the event data, record management and reporting service 68G constructs an output response to the client application that initially requested the information. In some examples, the data may be included in a document, such as a HyperText Markup Language (HTML) document, or the data may be encoded in a JSON format or presented by a dashboard application executing on the requesting client computing device. For instance, as further described in this disclosure, example user interfaces that include the event information are depicted in the figures.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In accordance with techniques of this disclosure, in some examples, analytics service 68F determines whether a contaminant capture device 23 of a negative pressure re-usable respirator 13 is due for replacement. In one example, analytics service 68F determines whether a contaminant capture device 23A of negative pressure re-usable respirator 13A of FIG. 1 is due for replacement based at least in part on sensor data (e.g., environmental sensor data and/or air pressure sensor data) and one or more rules. In some examples, the one or more rules are stored in models 74B. Although other technologies can be used, in some examples, the one or more rules are generated using machine learning. In other words, in one example implementation, analytics service 68F utilizes machine learning when operating on event streams 69 so as to perform real-time analytics. That is, analytics service 68F may include executable code generated by application of machine learning. The executable code may take the form of software instructions or rule sets and is generally referred to as a model that can subsequently be applied to event streams 69.

Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbor (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Analytics service 68F generates, in some example, separate models for individual workers, a population of workers, a particular environment, a type of respirator, a type of contaminant capture device, or combinations thereof. Analytics service 68F may update the models based on sensor data generated by PPE sensors or environmental sensors. For example, analytics service 68F may update the models for individual workers, a population of workers, a particular environment, a type of respirator, a type of contaminant capture device, or combinations thereof based on data received from safety equipment 62.

In some examples, analytics service 68F applies one or more of models 74B to event data 74A to determine whether contaminant capture device 23A of negative pressure re-usable respirator 13A is due for replacement. In some examples, analytics service 68F applies one or more models 74B to sensor data received from negative pressure re-usable respirator 13 to determine whether a contaminant capture device 23 is due for replacement. In one example, contaminant capture device 23A of respirator 13A includes a particulate filter and analytics service 68F receives sensor data (e.g., pressure data) from a pressure sensor that measures the air pressure of the air within a cavity formed by the worker's face and respirator 13A. In some examples, analytics service 68F applies a model from models 74B to the air pressure data from the pressure sensor. For example, analytics service 68F may receive pressure data indicating a pressure differential in the air pressure within the cavity over time as the worker inhales, and may determine whether the particulate filter is due for replacement based on the air pressure differential.

In some examples, the sensor data received from safety equipment 62 includes physiological sensor data generated by one or more physiological sensors associated with a worker 10. Analytics service 68F may determine whether contaminant capture device 23A is due for replacement based on physiological data and pressure data. For example, analytics service 68F may apply one or more models of models 74B to PPE pressure sensor data and physiological sensor data. Typically, the air pressure within the cavity formed between the worker's face and respirator decreases as the worker inhales. For example, analytics service 68F may determine a pressure differential over time for the pressure when worker 10A inhales. When the particulate filter is new and the worker is not breathing heavily, the pressure differential may be relatively small, compared to the pressure differential when the particulate filter is relatively saturated with particulates. For instance, when the particulate filter is relatively saturated, worker 10A may breathe hard such that the pressure may decrease more than when the particulate filter is relatively new.

In some examples, analytics service 68F applies one or more models to at least the pressure data to determine whether the particulate filter is due for replacement. Models 74B may be trained based on pressure differentials for a particular worker, worker feedback indicating worker 10A is having difficulty breathing, a type of respirator, a type of particulate filter, a type of contaminant, or a combination therein. In some examples, the one or more models 74B are trained based on physiological data (e.g., heart rate data, breathing rate data). For example, a worker may breathe heavy (e.g., thus increasing the air pressure differential) because a filter is saturated (e.g., and due for replacement) or because a worker is physically active (e.g., moving within the environment, such as walking up stairs). In such examples, analytics service 68F applies one or more of models 74B to the PPE air pressure data and the physiological data to determine whether the particulate filter is saturated (e.g., such that the particulate filter is due for replacement). For example, analytics service 68F apply the models 74B to air pressure data indicating a relatively high pressure differential and physiological sensor data indicating a relatively high breathing rate and/or relatively high pulse rate, and determine based on application of the model 74B that the particulate filter is not due for replacement. In other words, analytics service 68G may infer that the worker is breathing hard because he or she is exercising rather than due to a saturated or congested particulate filter, such that analytics service 68F may determine that particulate filter is not due for replacement. As another example, analytics service 68F applies the models 74B to air pressure data indicating a relatively high pressure differential and physiological sensor data indicating a relatively low breathing rate and/or relatively low pulse rate, and determine based on application of the model 74B that the particulate filter is due for replacement.

In some examples, contaminant capture device 23B of negative pressure re-usable respirator 13B includes a chemical cartridge and analytics service 68F determines whether the contaminant capture device 23B is due for replacement based at least in part on sensor data from one or more sensing stations 21. In one example, the sensor data includes data indicative the concentration level of one or more respective gases, vapor, or other chemicals present in the air of environment 8B of FIG. 1. Analytics service 68F applies one or more models 74B to the environmental sensor data generated by sensing stations 21 to determine whether contaminant capture device 23B is due for replacement. For instance, analytics service 68F may determine, based on application of one or more models 74B to the environmental sensor data, a threshold exposure time (e.g., a maximum amount of time) that contaminant capture device 23B provides protection. In some examples, analytics service 68F may determine an amount of time worker 10B is located within environment 8B, and compare the amount of time worker 10B is located within environment 8B to the threshold exposure time to determine whether contaminant capture device 23B is due for replacement. In some examples, hub 14A detects that worker 10A has entered environment 8B (e.g., based on GPS) and sends data indicating that worker 10A has entered environment 8B to PPEMS 6, such that analytics service 68F receives event data 74A (e.g., from hub 14) indicating worker 10A has entered environment 8B and tracks the time worker 10A is located within environment 8B.

In some examples, analytics service 68F dynamically determines an amount of contaminant capture device 23B (e.g., a chemical cartridge) that has been consumed. For example, analytics service 68F may apply one or more models 74B to environmental sensor data from sensing stations 21 continuously or periodically to determine the amount of contaminant capture device 23B consumed as conditions of environment 8B change throughout the day. In some instances, analytics service 68F determines that the concentration levels of a particular gas in environment 8B are relatively high and that a relatively high proportion (e.g., 40%) of contaminant capture device 23B has been exhausted or consumed while worker 10B utilized contaminant capture device 23B for a first period of time (e.g., two hours). In another instance, analytics service 68F may determine that the concentration levels of the particular gas decrease to a relatively low concentration (e.g., relative to the earlier period of time) and that a relatively low (e.g., 20%) of contaminant capture device 23B was exhausted or consumed in the second period of time. In one instance, analytics service 68F determines a cumulative amount of contaminant capture device 23B that has been consumed during the first and second periods of time. In some examples, analytics service 68F determines whether contaminant capture device 23B is due for replacement by comparing the cumulative consumption to a threshold consumption. As one example, analytics service 68F determines that contaminant capture device 23B is due for replacement in response to determining that the cumulative consumption satisfies (e.g., is greater than) the threshold consumption or that contaminant capture device 23B is not due for replacement in response to determining that the cumulative consumption does not satisfy (e.g., is less than) the threshold consumption.

As described above, analytics service 68F determines, in one example, whether contaminant capture device 23B is due for replacement based on applying one or more models 74B to at least a portion of event data 74A. Models 74B may be trained based on event data 74A associated with a particular worker, a plurality of workers, the particular contaminants within the work environment 8B, a type of contaminant capture device 23 utilized by the worker, or a combination therein. In some instances, the particular models 74B applied to the event data 74A for worker 10A are trained based on event data 74A for workers 10A and the models 74B applied to event data 74A for worker 10B are trained based on event data 74A for worker 10B. In one example, the particular models 74B applied to the event data 74A for worker 10A are trained based on event data 74A for a plurality of workers 10. In some examples, the particular models 74B applied to the event data 74A for worker 10A are trained based on the type of contaminant capture device 23A utilized by worker 10A. As yet another example, the particular models 74B applied to the event data 74A for worker 10A may be trained based on contaminants within work environment 8B, while the particular models 74B applied to the event data 74A for a worker within environment 8A may be trained based on contaminants within work environment 8A.

PPEMS 6 performs one or more actions in response to determining that contaminant capture device 23 is due for replacement. In some examples, notification service 68E outputs a notification indicating that a contaminant capture device 23 is due for replacement. For example, notification service 68E may output the notification to at least one of clients 63 (e.g., one or more of computing devices 60, hubs 14, safety stations 15, or a combination therein). In one instance, the notification indicates which worker of workers 10 is associated with the article or component that is due for replacement, a location of the worker, a location at which a replacement is located, etc. As another example, notification service 68E may output a command (e.g., to a respective hub 14A or other computing device associated with worker 10A, such as a computing device 300 illustrated in FIG. 3) to output an alert indicating contaminant capture device 23A is due for replacement. For example, respirator hub 14A may receive the command and may output an alert (e.g., visual, audible, haptic) to indicate contaminant capture device 23A is due for replacement. While PPEMS 6 is described as determining whether contaminant capture device 23 is due for replacement and performing actions, a computing device (e.g., a hub 14 or computing device of negative pressure re-usable respirator 13) associated with a worker may perform similar functionality.

In some examples, analytics service 68F determines, based on event data 74A, whether a contaminant capture device 23 of the negative pressure re-usable respirator 13 satisfies one or more safety rules (e.g., for a task to be performed, for the hazards present or likely to be present within work environment 8B). For example, analytics service 68F may determine whether one or more contaminant capture devices 23 utilized by a worker 10 (e.g., contaminant capture devices 23A utilized by worker 10A) satisfies one or more safety rules associated with work environment 8B. In some instances, models 74B include safety rules specifying a type of contaminant capture device 23 associated with each of work environments 8B or associated with particular hazards (e.g., gases, vapors, particulates). In such instances, analytics service 68F determines whether contaminant capture devices 23A satisfies the safety rules based on data received from the contaminant capture device 23A. For instance, each identification information corresponding to the contaminant capture device 23A (e.g., information identifying a type of the contaminant capture device 23A) and a communication device, such as an RFID tag (e.g., passive RFID tag), that transmits the information. In one instance, the memory device includes an RFID tag that stores identification information for contaminant capture device 23A. In another instance, contaminant capture device 23A includes an identifier indicative of identification information for contaminant capture device 23A.

In some examples, negative pressure re-usable respirator 13A includes a computing device (e.g., located between the facepiece and the user's contaminant capture device 23 may include a memory device that stores face) that includes a communication device (e.g., a RFID reader) configured to receive information from a contaminant capture device 23A. In one example, negative pressure re-usable respirator 13A includes a computing device that receives the identification information from negative pressure re-usable respirator 13A and outputs the identification information to PPEMS 6. PPEMS 6 may receive the identification information (e.g., indicating a type of contaminant capture device 23A), determine one or more rules associated with contaminant capture device 23A, and determine whether the type of the contaminant capture device 23A satisfies the rules. In one instance, analytics service 68F determines whether the type of contaminant capture device 23A is the correct type of contaminant capture device 23A for the environment or hazards within the environment. As another example, a computing device associated with worker 10A (e.g., hub 14A or a computing device) may determine whether contaminant capture device 23A satisfies the one or more safety rules.

In accordance with one or more aspects of this disclosure, in some examples, analytics service 68F determines whether usage of one or more negative pressure re-usable respirators 13 satisfies one or more safety rules associated with a worker. In one example, analytics service 68F determines whether usage of negative pressure re-usable respirator 13A by worker 10A satisfies a safety rule based at least in part on worker data 74C, models 74B, event data 74A (e.g., sensor data), or a combination therein. The safety rules may be associated with conditions indicating whether a worker is clean shaven or lifts a respirator from his or her face.

In some examples, analytics service 68F determines whether usage of negative pressure re-usable respirator 13A satisfies a safety rule by comparing a distance between negative pressure re-usable respirator 13A and a face of worker 10A to a threshold distance. Analytics service 68F determines the distance between negative pressure re-usable respirator 13A and a face of worker 10A based on sensor data. In one instance, event data 74A for worker 10A includes sensor data indicative of the distance (e.g., actual distance) between the face of worker 10A and negative pressure re-usable respirator 13A. For instance, the event data 74A may include data generated by an infrared sensor of a computing device of negative pressure re-usable respirator 13A. In some examples, analytics service 68F determines that the distance between the face of worker 10A and negative pressure re-usable respirator 13A satisfies (e.g., is greater than or equal to) a threshold distance, which may indicate that worker 10A has lifted negative pressure re-usable respirator 13A away from his or her face, that worker 10A has facial hair (e.g., is not clean shaven), or that negative pressure re-usable respirator 13A is not positioned properly upon the face of worker 10A.

In some examples, the threshold distance may be associated with a group of workers 10. For example, analytics service 68F may utilize a single threshold distance for each of workers 10. In some examples, each worker of workers 10A may be associated with a respective threshold distance (e.g., stored in worker data 74C or safety rules 74B). For example, to ensure the space between the face of worker 10A and negative pressure re-usable respirator 13A remains sealed from contaminated air within work environment 8B, worker 10A may be required to be clean shaven. Worker 10A may be clean shaven when at least a threshold amount of facial hair (e.g., 80%, 90%, 95%, etc.) is removed from portions of worker 10A's face that are capable of growing facial hair. In such examples, the threshold distance associated with each respective worker of workers 10 may correspond to respective distance between the face of the worker and a respirator when the worker is known to be clean shaven. In other words, the threshold distance for worker 10A may be different than the threshold distance for worker 10B. In one example, analytics service 68F determines that the usage of negative pressure re-usable respirator 13A satisfies a safety rule by determining that the distance between the face of worker 10A and negative pressure re-usable respirator 13A satisfies (e.g., is greater than) the threshold distance associated with worker 10A. As another example, analytics service 68F may determine that the usage of negative pressure re-usable respirator 13B does not satisfy the safety rule by determining that the distance between the face of worker 10B and negative pressure re-usable respirator 13B does not satisfy (e.g., is less than) the threshold distance associated with worker 10B.

According to some examples, analytics service 68F may determine whether the distance between the face of worker 10A and negative pressure re-usable respirator 13A satisfies different threshold distances. For example, a first threshold distance may be associated with the presence of facial hair and a second threshold distance (e.g., greater than the first threshold distance) may be lifting or removing the negative pressure re-usable respirator 13. In some examples, analytics service 68F may determine that worker 10A has facial hair (e.g., is not clean shaven) in response to determining that the distance between the face of worker 10A and negative pressure re-usable respirator 13A satisfies a first threshold distance, and that worker 10A has lifted negative pressure re-usable respirator 13A away from his face in response to determining that the distance between the face of worker 10A and negative pressure re-usable respirator 13A satisfies a second threshold distance.

In some examples, analytics service 68F determines whether a particular worker satisfies one or more safety rules that are associated with a worker. In some examples, the safety rules associated with a worker may include rules indicating a level of experience or training the worker should have to perform certain tasks or work in certain work environments. In some examples, analytics service 68F determines whether worker 10A satisfies one or more safety rules associated with worker 10A based at least in part on worker data 74C. For example, worker data 74C may include data indicating an experience level of each worker of workers 10, trainings received by each worker of workers 10, or a combination therein. Analytics service 68F may determine whether worker 10A satisfies one or more safety rules of models 74B by querying worker data 74C and comparing the worker data associated with worker 10A to the safety rules. For instance, safety rules 74B may indicate one or more training a worker 10 must receive prior to using a particular negative pressure re-usable respirator 13 (e.g., a particular type of negative pressure re-usable respirator 13). Analytics service 68F may determine whether worker 10A satisfies such a safety rule by querying worker data 74C to determine whether worker 10A has been trained to use negative pressure re-usable respirator 13A.

In some examples, notification service 68E outputs a notification in response to determine that a safety rule is not satisfied (e.g., a worker 10 does not satisfy a safety rule, or an article of PPE or component of an article of PPE does not satisfy a safety rule). For example, notification service 68E may output the notification to at least one of clients 63 (e.g., one or more of computing devices 60, hubs 14, safety stations 15, or a combination therein). In some examples, the notification indicates whether contaminant capture device 23A satisfies the one or more rules. The notification may indicate which worker of workers 10 is associated with the article or component that is due for replacement, a location of the worker, a location at which a replacement is located, etc. In some examples, the notification may indicate that a worker is not clean shaven or has lifted a respirator away from his or her face. As another example, the notification may indicate that worker 10A is not trained to utilize the particular negative pressure re-usable respirator 13.

Figure 3:
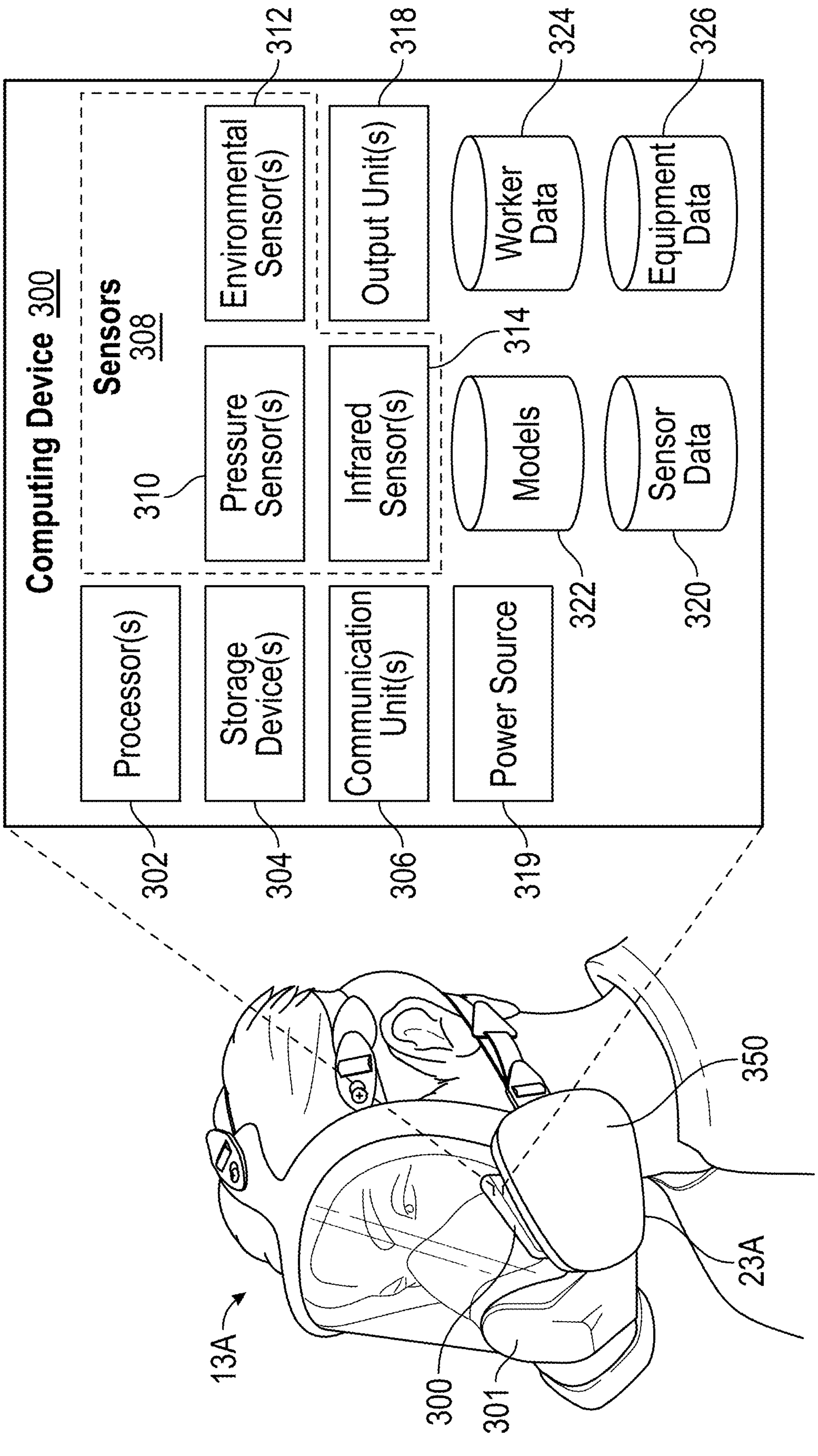
FIG. 3 is a conceptual diagram illustrating an example negative pressure re-usable respirator, in accordance with various techniques of this disclosure.

FIG. 3 is a conceptual diagram illustrating an example negative pressure re-usable respirator, in accordance with aspects of this disclosure. Negative pressure re-usable respirator 13A is configured to receive (e.g., be physically coupled to) one or more contaminant capture devices 23A, such as a particulate filter, a chemical cartridge, or both. Negative pressure re-usable respirator 13A is configured to physically couple to computing device 300. Negative pressure re-usable respirator 13A includes a facepiece (e.g., a full facepiece, or a half facepiece) 301 configured to cover at least a worker's nose and mouth. In some examples, computing device 300 is located with facepiece 301. It should be understood that the architecture and arrangement of negative pressure re-usable respirator 13A and computing device 300 illustrated in FIG. 3 is shown for exemplary purposes only. In other examples, negative pressure re-usable respirator 13A and computing device 300 may be configured in a variety of other ways having additional, fewer, or alternative components than those shown in FIG. 3. In some examples, any of the components included within computing device 300 and/or computing device 300 itself, may be manufactured and/or configured to be intrinsically safe to provide safe operation in hazardous areas through one or more techniques and/or constructions that may limit the energy, electrical and thermal, available for ignition.

In the example of FIG. 3, contaminant capture device 23A includes a memory device and a communication device, such as RFID tag (e.g., passive RFID tag). RFID tag stores information corresponding to contaminant capture device 23A (e.g., information identifying a type of the contaminant capture device 23A) and outputs the information corresponding to contaminant capture device 23A in response to receiving a signal from another communication device (e.g., an RFID reader).

Computing device 300 may be configured to physically couple to negative pressure re-usable respirator 13A. In some examples, computing device 300 may be disposed between facepiece 301 of negative pressure re-usable respirator 13A and a face of worker 10A. For example, computing device 300 may be physically coupled to an inner wall of the respirator cavity. Computing device 300 may be integral with negative pressure re-usable respirator 13A or physically separable from negative pressure re-usable respirator 13A. In some examples, computing device 300 is physically separate from negative pressure re-usable respirator 13A and communicatively coupled to negative pressure re-usable respirator 13A. For example, computing device 300 may be a smartphone carried by worker 10A or a data hub worn by worker 10A.

Computing device 300 includes one or more processors 302, one or more storage devices 304, one or more communication units 306, one or more sensors 308, one or more output units 318, sensor data 320, models 322, and worker data 324. Processors 302, in one example, are configured to implement functionality and/or process instructions for execution within computing device 300. For example, processors 302 may be capable of processing instructions stored by storage device 304. Processors 302 may include, for example, microprocessors, digital signal processors (DSPs), application specific integrated circuits (ASICs), field-programmable gate array (FPGAs), or equivalent discrete or integrated logic circuitry.

Storage device 304 may include a computer-readable storage medium or computer-readable storage device. In some examples, storage device 304 may include one or more of a short-term memory or a long-term memory. Storage device 304 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, storage device 304 may store an operating system or other application that controls the operation of components of computing device 300. For example, the operating system may facilitate the communication of data from electronic sensors 308 to communication unit 306. In some examples, storage device 304 is used to store program instructions for execution by processors 302. Storage device 304 may also be configured to store information within computing device 300 during operation.

Computing device 300 may use one or more communication units 306 to communicate with external devices via one or more wired or wireless connections. Communication units 306 may include various mixers, filters, amplifiers and other components designed for signal modulation, as well as one or more antennas and/or other components designed for transmitting and receiving data. Communication units 306 may send and receive data to other computing devices using any one or more suitable data communication techniques. Examples of such communication techniques may include TCP/IP, Ethernet, Wi-Fi, Bluetooth, 4G, LTE, to name only a few examples. In some instances, communication units 306 may operate in accordance with the Bluetooth Low Energy (BLU) protocol. In some examples, communication units 306 may include a short-range communication unit, such as an RFID reader.

In general, computing device 300 includes a plurality of sensors 308 that generate sensor data indicative of operational characteristics of negative pressure re-usable respirator 13A, contaminant capture devices 23A, and/or an environment in which negative pressure re-usable respirator 13A is used. Sensors 308 may include an accelerometer, a magnetometer, an altimeter, an environmental sensor, among other examples. In some examples, environment sensors may include one or more sensors configured to measure temperature, humidity, particulate content, gas or vapor concentration levels, or any variety of other characteristics of environments in which negative pressure re-usable respirator 13A are used. In some examples, one or more of sensors 308 may be disposed between facepiece 301 of negative pressure re-usable respirator 13A and a face of worker 10A. For example, one of sensors 308 (e.g., an air pressure sensor) may be physically coupled to an inner wall of the respirator cavity.

In the example of FIG. 3, sensors 308 include one or more air pressure sensors 310 configured to measure air pressure within a cavity formed or defined by a face of worker 10A and negative pressure re-usable respirator 13A. In other words, air pressure sensors 310 detect the air pressure of the air located in the sealable space between the face of worker 10A and facepiece 301 as the worker inhales and exhales.

Computing device 300 includes one or more output units 318 configured to output data that is indicative of operation of negative pressure re-usable respirator 13A. In some examples, output unit 318 output data from the one or more sensors 308 of negative pressure re-usable respirator 13A. For example, output unit 318 may generate one or more messages containing real-time or near real-time data from one or more sensors 308 of negative pressure re-usable respirator 13A for transmission to another device via communication unit 306. In some examples, output unit 318 are configured to transmit the sensor data in real-time or near-real time to another device (e.g., safety equipment 62) via communication unit 306. However, in some instances, communication unit 306 may not be able to communicate with such devices, e.g., due to an environment in which negative pressure re-usable respirator 13A is located and/or network outages. In such instances, output unit 318 may cache usage data to storage device 304. That is, output unit 318 (or the sensors themselves) may send usage data to storage device 304, e.g., as sensor data 320, which may allow the usage data to be uploaded to another device upon a network connection becoming available.

In some examples, output unit 318 is configured to generate an audible, visual, tactile, or other output that is perceptible by a user of negative pressure re-usable respirator 13A. Examples of output are audio, visual, or tactile output. For example, output units 318 include one more user interface devices including, as examples, a variety of lights, displays, haptic feedback generators, speakers or the like. Output units 318 may interpret received alert data and generate an output (e.g., an audible, visual, or tactile output) to notify a worker using negative pressure re-usable respirator 13A of an alert condition (e.g., that the likelihood of a safety event is relatively high, that the environment is dangerous, that negative pressure re-usable respirator 13A is malfunctioning, that one or more components of negative pressure re-usable respirator 13A need to be repaired or replaced, or the like).

According to aspects of this disclosure, processors 302 utilize sensor data (e.g., data from pressure sensors 310, environmental sensors 312, and/or infrared sensors 314 of computing device 300, data from sensing stations 21 of FIG. 1, or other sensors) in a variety of ways. In some examples, processors 302 are configured to perform all or a portion of the functionality of PPEMS 6 described in FIGS. 1 and 2. While processors 302 are described as performing the functionality in FIG. 3, in some examples, other devices (e.g., PPEMS 6, hubs 14, other devices, or a combination therein) perform functionality described with reference to processors 302.

In the example of FIG. 3, computing device 300 includes sensor data 320, models 322, and worker data 324. Sensor data 320 includes data regarding operation of negative pressure re-usable respirator 13A, physiological conditions of worker 10A, characteristics of environment 8B, or a combination thereof. In other words, sensor data 320 may include data from PPE sensors, physiological sensors, and/or environmental sensors. Models 322 include historical data (e.g., historical sensor data) and models, such as models 74B described with reference to FIG. 2. Worker data 324 may include worker profiles, such as worker data 74C described with reference to FIG. 2.

Processors 302 may determine whether contaminant capture devices 23A are due for replacement based at least in part on air pressure data generated by air pressure sensors 310 or environmental data generated by an environmental sensors 312 (additionally or alternatively, by sensing stations 21 of FIG. 1). In some instances, processors 302 apply one or more models 322 to sensor data 320 to determine whether contaminant capture devices 23A are due for replacement. In some examples, models 322 may be trained based on historical data (e.g., air pressure data, physiological sensor data). For example, models 322 may be trained on historical air pressure data associated with worker 10A, historical physiological data, and historical user feedback from worker 10A indicating worker 10A is having difficulty breathing, which may indicate that a particulate filter of contaminant capture device 23A is saturated and/or due for replacement. In such examples, processors 302 apply models 322 to predict when contaminant capture devices 23A are due for replacement based on current (e.g., real-time, or near real-time) air pressure data from air pressure sensors 310.

In some examples, models 322 are trained on historical environmental data (e.g., indicative of gas or vapor concentration levels) generated by environmental sensors 312 or sensing stations 21 of FIG. 1 and historical determinations of contaminant capture device lifespan. Processors 302 may apply models 322 to current environmental sensor data to determine a threshold exposure time and compare an actual exposure time to the threshold exposure time to determine whether contaminant capture device 23A is due for replacement. As another example, processors 302 may apply models 322 to current environmental sensor data to determine a cumulative consumption and compare the cumulative consumption to a threshold consumption to determine whether contaminant capture device 23A is due for replacement.

In some examples, processors 302 determine whether the sealable space between a face of worker 10A and respirator 13A is sealed. The sealable space may not be sealed when there is a leak in the seal, when respirator 13A is not properly positioned on the face of worker 10A, or when worker 10A removes respirator 13A. Processors 302 may determine whether the sealable space is sealed based at least in part on the air pressure data. For example, processors 302 may compare the pressure to a baseline pressure (e.g., a pressure when respirator 13A is known to provide a seal) and determine that the seal is broken in response to determining that the pressure does not satisfy the baseline pressure. In such examples, output units 318 may output an alert indicating a possible leak in the seal.

In some examples, processors 302 determine whether negative pressure re-usable respirator 13A and/or contaminant capture device 23A satisfies one or more safety rules associated with a particular work environment (e.g., environment 8B of FIG. 1). The safety rules may indicate that respirator 13A should be worn. In some examples, infrared sensor 314 outputs data indicative of whether respirator 13A is worn. For example, the infrared sensor data may include data indicating a distance between respirator 13A and the nearest object. In some instances, processors 302 determine whether respirator 13A is worn by comparing the distance to a threshold distance. For instance, the threshold distance may be a distance between facepiece 301 and the face of worker 10A when worker 10A is known to be wearing respirator 13A. As another example, the infrared sensor data may include temperature data. Processors 302 may determine whether respirator 13A is worn by comparing the temperature data to a threshold temperature that is indicative of a human body (e.g., approximately 98.6 degrees Fahrenheit or approximately 37 degrees Celsius).

In some instances, the safety rules indicate that a contaminant capture device 23A should be physically coupled to respirator 13A. In such instances, processors 302 determine whether contaminant capture device 23A is present (e.g., attached to respirator 13A) by causing communication units 306 to emit an RFID signal and determining whether communication units 306 receive a signal that includes identification information for a contaminant capture device 23. In one example, processors 302 determine that a contaminant capture device 23 is not present when identification information is not received and determine that a contaminant capture device 23 is present identification information is received.

Processors 302 may determine whether contaminant capture devices 23A satisfies the safety rules based at least in part on data received from the contaminant capture device 23A. For instance, contaminant capture device 23A may include RFID tag 350 that stores identification information corresponding to the contaminant capture device 23A (e.g., information identifying a type of the contaminant capture device 23A). Processors 302 may receive the identification information for contaminant capture device 23A. For instance, models 322 may include data indicative of one or more safety rules, such as indicating the type of contaminant capture device 23A associated with various hazards or environments.

Processors 302 determine, in some examples, whether contaminant capture device 23A satisfies a safety rule by determining whether contaminant capture device 23A is authentic. In some examples, processors 302 determine whether contaminant capture device 23A is authentic based on the identification information. For example, processors 302 may authenticate the contaminant capture device by comparing the received identification information to known authentication information. In some instances, equipment data 326 includes authentication information for authentic or verified contaminant cartridge devices. In such instances, processors 302 may query equipment data 326 to determine whether contaminant capture device 23A is authentic. In other example, processors 302 query a remote computing device (e.g., PPEMS 6) via communication units 306 to determine whether contaminant capture device 23A is authentic. For example, processors 302 may output a notification to PPEMS 6 that includes the identification information of contaminant capture device 23A and a request for PPEMS 6 to authenticate the identification information. Responsive to determining that contaminant capture device 23A is not present or is not authentic, computing device 300 may output a notification (e.g., to PPEMS 6) indicating that contaminant capture device 23A is not present or is not authentic. In some examples, output units 318 output an alert (e.g., audible, visual, haptic) indicating that contaminant capture device 23A is not present or is not authentic in response to determining that that contaminant capture device 23A is not present or is not authentic.

In some examples, processors 302 determine, based on the identification information and models 322, whether contaminant capture device 23A satisfies the safety rules by determining whether the type of the contaminant capture device 23A corresponds to (e.g., is a same or similar to) the type of the contaminant capture device associated with the environment or hazards within the environment. In other words, processors 302 may determine whether contaminant capture device 23A is the right type of particulate filter or chemical cartridge to protect worker 10A in the work environment.

Processors 302 may determine whether usage of one or more negative pressure re-usable respirator 13A satisfies one or more safety rules associated with worker 10A. In some examples, the safety rules are associated with conditions indicating whether a worker is clean shaven or lifts a respirator from his or her face. In some examples, processors 302 determines whether usage of negative pressure re-usable respirator 13A satisfies a safety rule by determining whether worker 10A is clean shaven or lifts negative pressure re-usable respirator 13A from his or her face. In one example, processors 302 determine whether worker 10A is clean shaven by determining a distance between negative pressure re-usable respirator 13A and the face of worker 10A and comparing the distance to a threshold distance. For instance, processors 302 may receive data indicating the distance between negative pressure re-usable respirator 13A and the face of worker 10A from infrared sensor 314, such that processors 302 determine that worker 10A is not clean shaven in response to determining that the distance satisfies (e.g., is greater than) a first threshold distance associated with worker 10A. In another example, processors 302 determine that worker 10A has lifted respirator 13A from his or her face in response to determining that the distance satisfies (e.g., is greater than) a second threshold distance.

In some examples, processors 302 determine whether worker 10A satisfies one or more safety rules that are associated with worker 10A. For example, processors 302 may determine whether worker 10A has the experience or training to work in a particular environment (e.g., environment 8B of FIG. 1), perform a particular task, operate a particular type of equipment, utilize a particular type of respirator, etc. For instance, worker data 324 includes a worker profile indicating an experience level of worker 10A, trainings received by worker 10A, demographic data (e.g., age) for worker 10A, medical data for worker 10A, whether worker 10A has been fitted for a particular type of respirator 13A, among other data. Worker data 324 includes worker profiles for worker 10A and additional workers 10. In one example, processors 302 apply one or more models 322 to worker data 324 (e.g., a worker profile) to determine whether worker 10A satisfies one or more safety rules. For example, processors 302 may determine whether worker 10A has been trained in hazards associated with the work environment in which worker 10A is located. As another example, processors 302 may determine whether worker 10A has been trained in the type of respirator 13A and/or contaminant capture device 23A associated with hazards in environment 8B.

Output units 318 output one or more alerts in response to determining that negative pressure re-usable respirator 13A and/or contaminant capture device 23A satisfies one or more safety rules associated with a particular work environment. In one example, output units 318 include one or more light sources that emit light (e.g., of one or more color) indicative of a status of the negative pressure re-usable respirator 13A. For instance, output unit 318 may output light of a first color (e.g., green) to indicate a normal status, light of a second color (e.g., yellow) to indicate contaminant capture device 23A is approaching time for replacement, and a light of a third color to indicate contaminant capture device 23A is due for immediate replacement. In another example, output units 318 output an alert in response to determining that usage of one or more negative pressure re-usable respirator 13A satisfies one or more safety rules or in response to determining that worker 10A satisfies one or more safety rules. For example, output units 318 may output light of a first color in response to determining that worker 10A does not satisfy a safety rule (e.g., is not trained on a particular type of negative pressure re-usable respirator 13A) or output light of a second color in response to determining that contaminant capture device 23A does not satisfy a safety rule (e.g., does not protect against hazards known to be present in the work environment).

In some examples, output units 318 output notifications to one or more other computing devices (e.g., hub 14A of FIG. 1, PPEMS 6 of FIG. 1, or both) via communication units 306. For example, the notification may include data indicating the identity of worker 10A, an environment 8B in which worker 10A is located, whether one or more safety rules are satisfied, among others. In some examples, the notification may indicate that a contaminant capture device 23A is due for replacement, that worker 10A is not clean shaven, or that worker 10A has lifted negative pressure re-usable respirator 13A from his or her face.

In some examples, a user may use re-usable respirator 13A and computing device 300 in conjunction with end-user computing device 16, as shown in FIG. 2. In some examples, the user may provide a user input to end-user computing device 16 to select or otherwise input at least one of: a type of contaminant removal device, a work zone to be entered, a work task to be done, a timestamp, a type of PPE, and/or a user identifier of the user. In some examples, the user may select or otherwise input a peripheral (e.g. computing device 300) or peripheral-respirator pair from a set of options that are output for display by end-user computing device 16. The options may be based on wireless information received by end-user computing device 16 from one or more other computing devices. For example, end-user computing device 16 may output for display information related to notifications received via Bluetooth communication in the area. In some examples, computing device 300 may be selected automatically based on the input information provided by the user. Upon selection of computing device 300, end-user computing device 16 may send a message to computing device 300 to output an alert, thereby indicating that the correct peripheral (e.g., computing device 300) has been selected by end-user computing device 16. For instance, end-user computing device 16 may be configured to communicate at least one message with computing device to establish a communication channel between end-user computing device 16 and computing device 300, and computing device 300 may be configured to output at least one of an audible alert, a visual alert, or a haptic alert in response to the at least one message. In another example, computing device 300 may communicate and/or be identified by Near Field Communications (NFC), Radio Frequency Identification (RFID), and the like. In another example, computing device 300 may communicate via a wired connection.

In some examples, end-user computing device 16 may determine a service life time, based at least in part on a selection or input provided by the user. The service life time may be a defined time duration, one or more timestamps, and/or a combination of time duration and timestamp(s). The service life time may be indicative of an amount of time that can elapse before service is required or recommended for re-usable respirator 13A. The service life time may be made via a lookup table, a calculation, or datastore or technique. In some examples, the service life time determinations may include other inputs in addition to the input provided by the user. For example, the service life timer determination may include the input provided by the user and additional inputs provided by environmental sensors 21. End-user computing device 16 may send data that indicates service life time to computing device 300, via wired or wireless connection, which may be stored at computing device 300.

Using the service life time, computing device 300 may start a timer. Computing device 300 may store a set of safety rules. The safety rules may be received from end-user computing device 16 contemporaneously with the service life time, or may be received from computing device 300 at a different time (before or after the service life time). Computing device 300 may generate alerts, based on a determination whether the service life time has been reached or expired. For example, the timer, which may be based on the service life time, may expire. Computing device 300 may perform one or more operations defined by the safety rules based at least in part on the determination that the service life time has been reach or expired. Computing device 300 may perform one or more operations defined by the safety rules based at least in part on the determination that the service life time will be reached or expire within a threshold period of time.

Computing device 300 may perform one or more operations defined by the safety rules based at least in part on the determination that the service life time has been reached or expired for more than a threshold period of time. For instance, computing device 300 may determine a service life time for the negative pressure reusable respirator; and perform at least one operation based at least in part on the service life time. In some examples, computing device 300 may determine that one or more safety rules that correspond to the service life time have been satisfied. Computing device 300 may configure a timer based at least in part on the service life time; and determine, based at least in part on a state of the timer, that the one or more safety rules have been satisfied. In some examples, the state of the timer may be an amount of time elapsed for the timer, an amount of time remaining for the timer, and/or a timestamp for the timer, such as a start timestamp, an end timestamp, and/or a current time timestamp.

In some examples, computing device 300 may cause an LED to change color, such as appear as green, or off (not emit light), or flash green when the remaining time in the service life time (as configured in the timer) is greater than 50% of the service life. Computing device 300 may cause the LED to change to a second color, or intensity, or frequency, when the remaining time in the service life time (as configured in the timer) is less than 30% of the service life, or 30 minutes. Computing device 300 may cause the LED to change to a third color, or intensity, or frequency, and the peripheral may provide additional alerts, such as audible or haptic, when the when the remaining time in the service life time (as configured in the timer) is less than 15% of the service life, or 15 minutes. In some examples, the computing device 300 may provide feedback to the user using one or more of audible, haptic, or visual feedback.

In some examples, computing device 300 may increment the timer configured with the service life time based at least in part on data from one or more other sensors. For example, computing device 300 may increment the timer only when a sensor identifies specific beacons that indicate a hazardous area or hazard. In another example, computing device 300 may increment the timer only when breathing is detected in the negative pressure re-usable respirator 13A. In another example, computing device 300 may increment the timer only when a face of the user is identified via an infrared sensor. In another example, computing device 300 may increment the timer only when motion or is detected by an accelerometer. In some examples, computing device 300 may increment the timer based one or a combination of such aforementioned data from sensors. In some examples, computing device 300 may increment the timer that is configured based on service life time without using data from other sensors.

In some examples, the techniques described herein for the service life time may be implemented without a graphical user interface at end-user computing device 16. In such examples, the service life time may be pre-loaded in computing device 300 at the time of manufacture, assembly or initial configuration. In such examples, the timer that is based on the service life time may be reset or otherwise configured via a command executed by the user that is provided via user input to computing device 300. For instance, the command may be the actuation of a button, a voice command, or any other suitable user input.

Computing device 300 may also include power source 319, such as a battery, to provide power to components shown in computing device 300. A rechargeable battery, such as a Lithium Ion battery, may provide a compact and long-life source of power. Computing device 300 may be adapted to have electrical contacts exposed or accessible from the exterior of the housing of computing device 300 to allow recharging of power source 319. Other examples of power source 319 may be a primary battery, replaceable battery, rechargeable battery, inductive coupling, or the like. A rechargeable battery may be recharged via a wired or wireless means.

In some examples, computing device 300 may determine, based on the data indicative of a breach of the sealed space formed by the face of the worker and the negative pressure reusable respirator, whether usage of the negative pressure reusable respirator satisfies one or more safety rules associated with the negative pressure reusable respirator. Computing device 300 may perform one or more actions in response to determining that usage of the negative pressure reusable respirator satisfies one or more safety rules associated with the negative pressure reusable respirator. In some examples, computing device 300 is configured to determine the breach of the sealed space formed by the face of the worker and the negative pressure reusable respirator based at least in part data from a pressure sensor operatively coupled to computing device 300. In some examples, computing device 300 is configured to determine the breach of the sealed space based at least in part on a determination, using the data from the pressure sensor, of a change in a pressure that satisfies a threshold. In some examples, computing device 300 is configured to determine the breach of the sealed space based at least in part data from a light sensor operatively coupled computing device 300. In some examples, computing device 300 is configured to determine the breach of the sealed space based at least in part on a determination, using the data from the light sensor, that the face of the user is not within a threshold distance of the respirator.

In some examples, the determination of the breach of the sealed space is based at least in part on at least one of a leak between the face of the worker and the negative pressure reusable respirator, a fit characteristic of the negative pressure reusable respirator, or a change in seal integrity of a seal included in the negative pressure reusable respirator. Examples of a fit characteristic may include the quality of the fit between the negative pressure reusable respirator and the user's face or a change in the quality of the fit between the negative pressure reusable respirator and the user's face. The quality of the fit between the negative pressure reusable respirator and the user's face may include the continuity of mechanical contact between the seal of the negative pressure reusable respirator and the user's face. For example, a discontinuity of the mechanical contact between the seal of the negative pressure reusable respirator and the user's face may result in ingress of unfiltered air into the negative pressure reusable respirator and a reduced quality of fit. A discontinuity of the mechanical contact between the seal of the negative pressure reusable respirator and the user's face may result from one or more of a mismatch in size or shape between the negative pressure reusable respirator and the user's face, the presence of facial hair, insufficient tightness of attachment straps, loosening of attachment straps, insufficient formation of malleable elements, a force applied to the respirator, pulling the respirator away from the face, a change in shape of the face, motion of respirator or any other feature or event that causes a discontinuity of the mechanical contact between the seal of the negative pressure reusable respirator and the user's face. In some examples, seal integrity may refer to the mechanical properties of physical elements of the negative pressure reusable respirator. For example, the seal integrity may refer to the continuity of the barrier formed by the physical elements of the negative pressure reusable respirator. For example, a reduced seal integrity may result from any of a perforation in a component of the respirator, an improper coupling of respirator elements, damage to the respirator, or anything that causes a change in the gas barrier formed by the respirator between the interior breathing space of the respirator and external environment.

Figure 4:
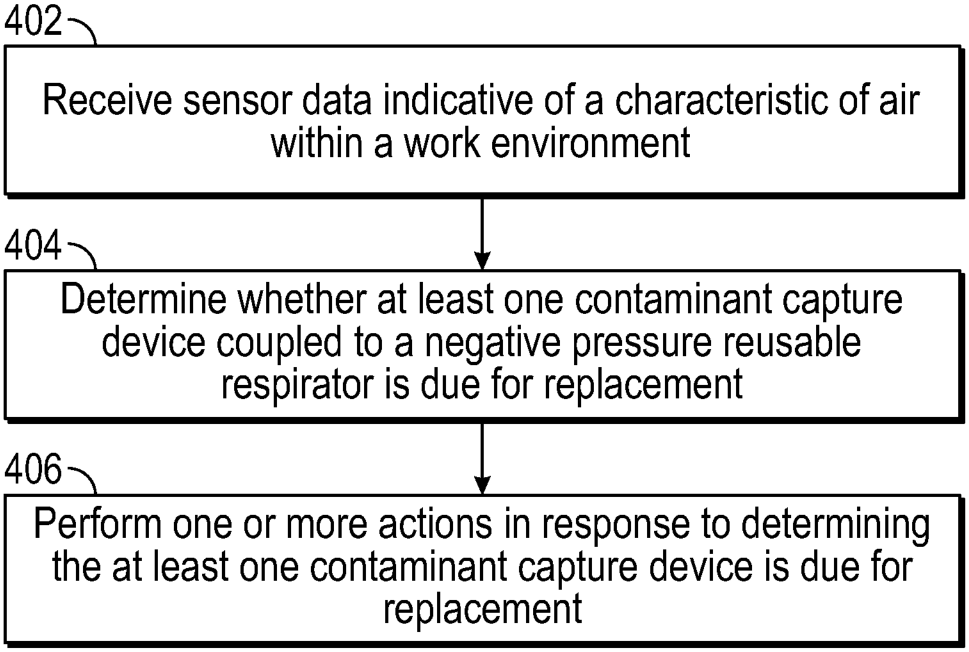
FIG. 4 is a flowchart illustrating example operations of an example computing system, in accordance with various techniques of this disclosure.

FIG. 4 is a flowchart illustrating example operations of an example computing system, in accordance with various techniques of this disclosure. FIG. 4 is described below in the context of negative pressure re-usable respirator 13A of FIG. 1, PPEMS 6 of FIGS. 1 and 2, and/or computing device 300 of FIG. 3. While described in the context of negative pressure re-usable respirator 13A, PPEMS 6, and/or computing device 300, other computing devices (e.g., a hub of hubs 14 of FIG. 1) may perform all or a subset of the functionality described.

In some examples, at least one computing device receives sensor data indicative of a characteristic of air within a work environment (402). For example, negative pressure re-usable respirator 13A may include a computing device 300 or may be configured to physically couple to computing device 300. In other words, computing device 300 may be integrally formed within negative pressure re-usable respirator (e.g., non-removable) or may be attachable/detachable. In one instance, computing device 300 receives sensor data from one or more sensors configured to generate sensor data indicative of a characteristic of air within a work environment. Additionally or alternatively, PPEMS 6 may receive the sensor data. In one example, the sensor data includes data generated by air pressure sensor 310, such as air pressure data indicative of the air pressure within a sealable or sealed space formed (e.g., defined) by a face of worker 10A and negative pressure re-usable respirator 13A. As another example, the sensor data may include data generated by an environmental sensor (e.g., environmental sensor 312 or sensing stations 21), such as environmental data indicative of a gas or vapor concentration level within a work environment (e.g., environment 8B of FIG. 1).

The at least one computing device determines, based at least in part on the sensor data, whether at least one contaminant capture device coupled to a negative pressure reusable respirator is due for replacement (404). For example, the at least one computing device may determines whether at least one contaminant capture device 23A is due for replacement based at least in part on air pressure data, environmental data, or both. In some examples, computing device 300 and/or PPEMS 6 determines whether at least one contaminant capture device 23A is due for replacement based at least in part on data from air pressure data. For example, PPEMS 6 and/or computing device 300 may determine whether the air pressure within the sealable space formed by the worker's face and negative pressure re-usable respirator 13A decreases below a threshold air pressure when the worker inhales.

In some examples, PPEMS 6 and/or computing device 300 determine whether the at least one contaminant capture device 23A is due for replacement based at least in part on the environmental data. According to some examples, PPEMS 6 and/or computing device 300 determines a threshold exposure time for the contaminant capture device 23A based on the environmental data (e.g., gas or vapor concentration level) and compares the actual exposure time for contaminant capture device 23A to the threshold exposure time. As another example, the computing device 300 and/or PPEMS 6 may determine a cumulative consumption of the contaminant capture device 23A and compare the cumulative consumption of the contaminant capture device 23A to a threshold consumption to determine whether contaminant capture device 23A is due for replacement.

At least one computing device performs one or more actions in response to determining the at least one contaminant capture device is due for replacement (406). In some examples, PPEMS 6 outputs a notification to another computing device (e.g., computing devices 16, 18 of FIG. 1 indicating contaminant capture device 23A is due for replacement. In another example, output unit 318 of computing device 300 outputs an alert indicating that contaminant capture device 23A is due for replacement.

According to some examples, at least one computing device determines, based on the data indicative of a position of the negative pressure reusable respirator relative to the face of the worker, whether usage of the negative pressure reusable respirator satisfies one or more safety rules associated with the negative pressure reusable respirator. In some instances, computing device 300 receives sensor data from an infrared sensor 314, the sensor data indicating a distance between negative pressure re-usable respirator 13A and a face of worker 10A. In one instance, computing device 300 and/or PPEMS 6 determine, based on the distance, whether worker 10A is clean shaven and/or whether negative pressure re-usable respirator 13A has been lifted from the face of worker 10A.

In some examples, PPEMS 6 and/or computing device 300 determine whether contaminant capture device 23A satisfies one or more safety rules associated with work environment 8B. In one example, contaminant capture device 23A include an RFID tag 350 and a communication unit 306 of computing device 300 includes an RFID reader. In such examples, one of communication units 306 receives identification information for contaminant capture device 23A from RFID tag 352 and determines whether contaminant capture device 23A satisfies one or more safety rules associated with the environment based on the identification information. For example, computing device 300 may determine whether contaminant capture device 23A fits negative pressure re-usable respirator 13A or whether contaminant capture device 23A is configured to protect worker 10A from hazards associated with environment 8B.

The following numbered examples may illustrate one or more aspects of the disclosure:

Example 1. A method comprising: receiving, by a at least one computing device, sensor data indicative of a characteristic of air within a work environment; determine, by the at least one computing device, based at least in part on the sensor data, whether at least one contaminant capture device coupled to a negative pressure reusable respirator is due for replacement, wherein the at least one contaminant capture device is configured to remove contaminants from air as the air is drawn through the contaminant capture device when a worker inhales, and wherein the at least one contaminant capture device is configured to be removable from the negative pressure reusable respirator; and performing, by the at least one computing device, one or more actions in response to determining the at least one contaminant capture device is due for replacement.

Example 2: The method of example 1, wherein the at least one contaminant capture device includes a cartridge configured to capture gases or vapors, and wherein the sensor includes a gas sensor or a vapor sensor.

Example 3: The method of example 2, wherein determining whether the at least one contaminant capture device is due for replacement includes determining, by the at least one computing device, an amount of time the negative pressure reusable respirator is worn by the worker; determining, by the at least one computing device, based at least in part on the sensor data, a threshold protection time of the at least one contaminant capture device; and determining, by the at least one computing device, whether the at least one contaminant capture device is due for replacement based on the threshold protection time and the amount of time the negative pressure reusable respirator is worn by the worker.

Example 4: The method of example 2, wherein the sensor data is first sensor data indicative of the characteristic of the air within the work environment and is associated with a first period of time, and wherein determining whether the at least one contaminant capture device is due for replacement includes: determining, by the at least one computing device, based on the first sensor data, a first amount of the at least one contaminant capture device that was consumed during the first period of time; receiving, by the at least one computing device, from the sensor, second sensor data indicative of the characteristic of the air within the work environment associated with a second period of time; determining, by the at least one computing device, based on the second sensor data, a second amount of the at least one contaminant capture device that was consumed during the second period of time; determining, by the at least one computing device, based on the first amount and the second amount, a cumulative amount of the at least one contaminant capture device that has been consumed; and determining, by the at least one computing device, whether the cumulative amount of the at least one contaminant capture device that has been consumed satisfies a threshold consumption.

Example 5: The method of any one of examples 1-4, wherein the at least one contaminant capture device includes a filter configured to capture particulates, wherein the sensor includes an air pressure sensor configured to generate sensor data indicative of an air pressure in a sealed space formed by a face of the worker and the negative pressure reusable respirator, and wherein determining whether the at least one contaminant capture device is due for replacement is based at least in part on the air pressure in the sealed space formed by the face of the worker and the negative pressure reusable respirator.

Example 6: The method of example 5, wherein determining whether the at least one contaminant capture device is due for replacement comprises applying, by the at least one computing device, a model to the sensor data indicative of the air pressure of air in a sealed space formed by a face of the worker and the negative pressure reusable respirator to determine whether the at least one contaminant capture device is due for replacement.

Example 7: The method of example 6, wherein the model is trained based at least in part on air pressure data associated with one or more of: the worker, a plurality of additional workers, contaminants within the work environment, or a type of contaminant capture device.

Example 8: The method of any one of examples 1-7, wherein performing the one or more actions comprises: outputting, by the at least one computing device, a notification to another at least one computing device, or outputting, by the at least one computing device, an alert to the worker.

Example 9: The method of example 8, wherein outputting the alert comprises at least one of an audible alert, a visual alert, or a haptic alert.

Example 10: The method of any one of examples 1-9, wherein the negative pressure reusable respirator is configured to physically couple to the at least one computing device.

Example 11: The method of any one of examples 1-10, wherein the at least one contaminant capture device includes a radio frequency identification (RFID) tag that stores identification information for the at least one contaminant capture device, the method further comprising: determining, by the at least one computing device, based at least in part on the data identifying the at least one contaminant capture device, whether the contaminant capture device satisfies one or more safety rules associated with work environment.

Example 12: The method of any one of examples 1-11, the method further comprising: receiving, by the at least one computing device, data indicative of the position of the negative pressure reusable respirator relative to the face of the worker; and determining, by the at least one computing device, based on the data indicative of the position of the negative pressure reusable respirator relative to the face of the worker, whether usage of the negative pressure reusable respirator satisfies one or more safety rules associated with the negative pressure reusable respirator.

Example 13: The method of example 12, wherein the data indicative of the position of the negative pressure reusable respirator relative to the face of the worker indicates a distance between the negative pressure reusable respirator and the face of the worker, and wherein determining whether the usage of the negative pressure reusable respirator satisfies the one or more safety rules comprises determining, by the at least one computing device, based at least in part on the distance, whether the worker is clean shaven.

Example 14: The method of example 13, wherein the data indicative of the position of the negative pressure reusable respirator relative to the face of the worker indicates a distance between the negative pressure reusable respirator and the face of the worker, and wherein determining whether the usage of the negative pressure reusable respirator satisfies the one or more safety rules comprises, determining, by the at least one computing device, based at least in part on the distance, whether the negative pressure reusable respirator has been pulled away from the face of the worker.

Example 15: A method comprising: receiving, by a at least one computing device, sensor data indicative of a position of the negative pressure reusable respirator relative to a face of a worker; determining, by the at least one computing device, based on the data indicative of the position of the negative pressure reusable respirator relative to the face of the worker, whether usage of the negative pressure reusable respirator satisfies one or more safety rules associated with the negative pressure reusable respirator; and performing, by the at least one computing device, one or more actions in response to determining that usage of the negative pressure reusable respirator satisfies one or more safety rules associated with the negative pressure reusable respirator.

Example 16: The method of example 15, further comprising the method of any of examples 1-14.

Example 17: A method comprising: receiving, by a at least one computing device, identification information for the at least one contaminant capture device that is configured to remove contaminants from air as the air is drawn through the contaminant capture device when a worker inhales and that is configured to be removable from a negative pressure reusable respirator; and determining, by the at least one computing device, based at least in part on the identification data for the at least one contaminant capture device, whether the contaminant capture device satisfies one or more safety rules associated with work environment.

Example 18: The method of example 17, further comprising the method of any of examples 1-14.

Although the methods and systems of the present disclosure have been described with reference to specific exemplary embodiments, those of ordinary skill in the art will readily appreciate that changes and modifications may be made thereto without departing from the spirit and scope of the present disclosure.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. A system comprising:

a negative pressure re-usable respirator configured to be worn by a worker and to cover at least a mouth and a nose of the worker to form a sealed space formed by a face of the worker and the negative pressure re-usable respirator, wherein the negative pressure re-usable respirator comprises at least one contaminant capture device configured to remove contaminants from air as the air is drawn through the contaminant capture device when the worker inhales, and wherein the at least one contaminant capture device is configured to be removable from the negative pressure re-usable respirator;

a pressure sensor configured to generate pressure sensor data indicative of an air pressure in the sealed space formed by the face of the worker and the negative pressure re-usable respirator;

an infrared sensor configured to generate infrared sensor data indicative of a distance between the face of the worker and the negative pressure re-usable respirator; and at least one processor configured to:

determine, based on the pressure sensor data and the infrared sensor data, whether a breach of the sealed space formed by the face of the worker and the negative pressure re-usable respirator has occurred;

perform one or more actions in response to determining the breach has occurred.

2. The system of claim 1, wherein the at least one processor is configured to determine the breach of the sealed space based at least in part on a determination, using the infrared sensor data, that the face of the user is not within a threshold distance of the respirator.

3. The system of claim 1, wherein the determination of the breach of the sealed space is based on at least one of a leak between the face of the worker and the negative pressure re-usable respirator, a fit characteristic of the negative pressure re-usable respirator, or a change in seal integrity of a seal included in the negative pressure re-usable respirator.

4. The system of claim 1, further comprising a first computing device comprising the at least one processor and a second computing device, wherein the first computing device is configured to communicate at least one message with the second computing device that establishes a communication channel between the first and second computing devices, and wherein the second computing device is configured to output at least one of an audible alert, a visual alert, or a haptic alert in response to the at least one message from the first computing device.

5. The system of claim 1, wherein the at least one processor is further configured to:

determine a service life time for the negative pressure re-usable respirator; and perform at least one operation based on the service life time.

6. The system of claim 5, wherein to perform at least one operation based at least in part on the service life time, the at least one processor is further configured to:

configure a timer based at least in part on the service life time; and determine, based on a state of the timer, that the service life time has been reached or expired.

7. The system of claim 6, wherein to determine, based at least in part on a state of the timer, that the service life time has been reached or expired, the at least one processor is further configured to determine that the state of the timer indicates at least one of: the timer will expire within a first threshold period of time, the time has expired, or the timer has been expired for a second threshold period of time.

8. The system of claim 6, wherein the at least one processor is further configured to generate an output based at least in part on the state of the timer.

9. The system of claim 8, wherein the at least one processor is further configured to increment the timer in response to data received from at least one other sensor.

10. The system of claim 1, wherein the at least one processor is configured to compare the pressure differential from the pressure sensor data to a threshold decrease in air pressure; and the measured distance from the infrared sensor data to a threshold distance to determine whether the breach as occurred.

11. The system of claim 1, wherein the at least one processor is further configured to:

determine whether the negative pressure re-usable respirator was pulled away from the worker's face based on the distance between the face of the worker and the negative pressure re-usable respirator.

12. The system of claim 1, wherein the at least one processor is further configured to compare the distance to a threshold distance using the infrared sensor data to determine whether the worker is clean shaven.

* * * * *